United States Patent [19]

Ukachi et al.

[11] Patent Number: 4,683,280

[45] Date of Patent: Jul. 28, 1987

[54] RADIATION CURABLE COMPOSITION

[75] Inventors: Takashi Ukachi; Keiichi Bessho, both of Yokohama; Atsushi Kumano, Kawasaki; Yoshio Matsumura, Yamato, all of Japan; Robert E. Ansel, Hoffman Estates, Ill.

[73] Assignees: DeSoto, Inc., Des Plaines, Ill.; Japan Synthetic Rubber Co., Ltd., Tokyo, Japan

[21] Appl. No.: 844,974

[22] Filed: Mar. 27, 1986

[30] Foreign Application Priority Data

Mar. 30, 1985 [JP] Japan .................................. 60-67998

[51] Int. Cl.$^4$ ............................................. C08G 18/38
[52] U.S. Cl. ...................................... 528/71; 528/75; 528/294; 528/295; 528/337
[58] Field of Search ................... 528/71, 75, 294, 295, 528/337

[56] References Cited

U.S. PATENT DOCUMENTS 3,867,351 2/1975 Juna et al. .............................. 528/71

Primary Examiner—Maurice J. Welsh
Attorney, Agent, or Firm—Dressler, Goldsmith, Shore, Sutker & Milnamow, Ltd.

[57] ABSTRACT

There is disclosed acrylate-terminated oligomers which are radiation-curable and which can be pigmented with magnetizable power to cure on electron beam exposure to provide superior magnetic recording structures. These oligomers include sulfonic acid groups which improve pigment wetting and which can be included in amide-containing compounds.

7 Claims, No Drawings

RADIATION CURABLE COMPOSITION

DESCRIPTION

1. Technical Field

This invention relates to radiation curable compositions which are particularly useful in radiation curable coating compositions, and in particular radiation curable coatings which contain a magnetic powder to prepare a magnetic coating composition suitable for the production of magnetic recording media, such as magnetic tapes and magnetic discs.

2. Background Art

In general, magnetic recording media are produced by applying a magnetic coating material composed of a magnetic powder, a polymer, a solvent and various additives to a substrate such as a polyester film to produce a magnetic layer.

Recently, there have been known processes which comprise preparing a magnetic coating material by mixing a radiation-curable polymer having acrylic double bonds with a magnetic powder, a solvent and the like to prepare a magnetic coating material, applying the magnetic coating material to a substrate and curing the coating by radiation (See, for example, Japanese Laid-Open Patent Publication No. 25230/1981, No. 124119/1981 and No. 77433/1975). Such magnetic coating materials prepared by mixing and dispersing a magnetic powder into a radiation-curable polymer are expected to be effective for the improvement of the pot life of the magnetic coating material, reduction in the amount of solvent used, and simplification of the production process of magnetic recording media, saving of the energy consumed for curing the magnetic coating, etc.

However, magnetic coating materials prepared using conventional radiation-curable polymers have the problem of insufficient dispersion of the magnetic powder due to the poor affinity between the magnetic powder and the polymer. Therefore, magnetic recording media produced by using such a magnetic coating material are unsatisfactory in the electromagnetic conversion characteristics and their practical durability is only comparable to that of the magnetic recording media produced by using the hitherto known magnetic coating materials containing a thermosetting resin.

Accordingly, an object of the present invention is to provide a coating material for use in radiation curing which has good properties as a radiation-curable coating material and high affinity for magnetic powders, thereby ensuring sufficient dispersion of the magnetic powder therein and, when used as a magnetic coating material, yields magnetic recording media with good practical durability.

The present invention provides a coating material for use in radiation curing comprising a polymer having a molecular weight of 2,000 to 100,000 and having:

(A) at least one structural unit selected from the structural units represented by the following general formulas (I), (II) and (III) on both ends of its molecule, (B) at least one structural unit selected from the structural units represented by the following general formulas (IV), (V), (VI) and (VII), (C) a structural unit represented by the following general formula (VIII), (D) a structural unit represented by the following general formula (IX), and optionally (E) at least one structural unit selected from the structural units represented by the following general formulas (X) and (XI).

wherein the structural units of the general formulas (I) to (XI) are linked by at least one linkage selected from urethane linkage

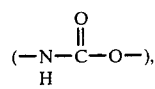

urea linkage

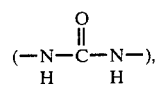

N-substituted urea linkage

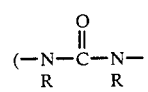

wherein R represents a $C_1$ to $C_8$ aliphatic, alicyclic or aromatic group which may be substituted or unsubstituted by hydroxyl groups or the like), the amide linkage

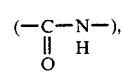

and the ester linkage

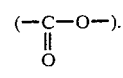

$$CH_2=C(R_1)- \quad (I)$$

wherein $R_1$ represents a hydrogen atom or a methyl group.

$$CH_2=C(R_1)-\overset{\underset{\|}{O}}{C}-O-R_2- \quad (II)$$

wherein $R_1$ is as defined in the general formula (I), and $R_2$ represents a $C_2$ to $C_8$, preferably $C_2$ to $C_3$, alkylene group such as ethylene, propylene, tetramethylene, pentamethylene, hexamethylene, heptamethylene and octamethylene group.

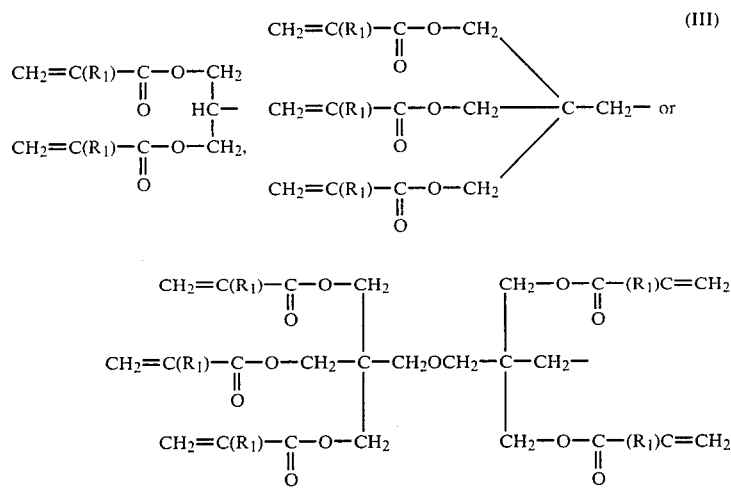 (III)

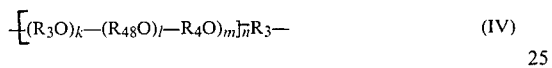

wherein $R_1$ is as defined in the general formula (I).

$$\{(R_3O)_k-(R_{48}O)_l-R_4O)_m\}_n R_3-  \quad (IV)$$

or $$\{(R_3O)_k-(R_{48}O)_l-R_4O)_m\}_n R_4-$$

wherein $R_3$ and $R_4$, which may be identical or different, represent a $C_2$ to $C_6$, preferably $C_2$ to $C_4$ alkylene group such as ethylene, propylene, tetramethylene, pentamethylene and hexamethylene group; $R_{48}$ represents a $C_{13}$ to $C_{18}$, preferably $C_{13}$ to $C_{15}$, divalent organic group having an aromatic group of the structural formula:

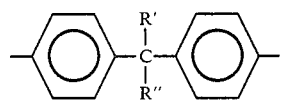

(wherein R' and R", which may be identical or different, represent an alkyl group such as methyl, ethyl and butyl group); k and m are each an integer of 0 to 50, preferably 5 to 20, l is an integer of 0 to 50, preferably 0 to 10, provided that k, l and m are not 0 simultaneously, and n is an integer of 0 to 50, preferably 1 to 10.

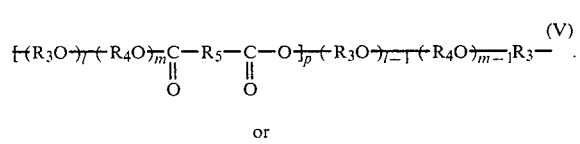 (V)

or

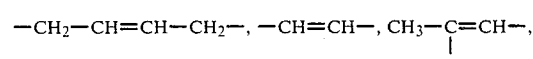

wherein $R_3$ and $R_4$ are as defined in the general formula (IV); $R_5$ represents a divalent aliphatic, alicyclic or aromatic hydrocarbon group with 2 to 8 carbon atoms having the structural formula:

$$-CH_2-CH=CH-CH_2-, \quad -CH=CH-, \quad CH_3-C=CH-,$$

-continued

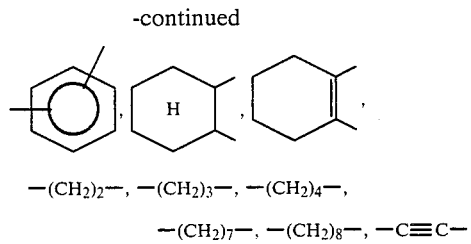

$$-(CH_2)_2-, \quad -(CH_2)_3-, \quad -(CH_2)_4-,$$
$$-(CH_2)_7-, \quad -(CH_2)_8-, \quad -C\equiv C-$$

and the like; l and m are as defined in the general formula (IV); and p is an integer of 1 to 50, preferably 1 to 20.

 (VI)

or

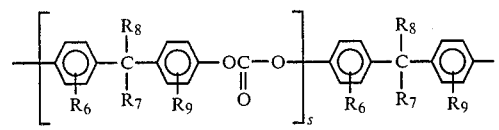

wherein $R_2$ is as defined in the general formula (II); $R_6$, $R_7$, $R_8$ and $R_9$, which may be identical or different, represent a hydrogen atom or a $C_1$ to $C_8$ aliphatic, alicyclic or aromatic group such as methyl, ethyl, propyl, butyl, pentyl, hexyl, heptyl, octyl, phenyl, cyclohexyl and the like, preferably a $C_1$ to $C_3$ alkyl group; r and s are an integer of 1 to 50, preferably 5 to 20; and q is an integer of 1 to 20, preferably 5 to 20.

 (VII)

wherein $R_{10}$ represents a divalent aliphatic, alicyclic or aromatic group with 2 to 40, preferably 2 to 20, carbon atoms such as ethylene, propylene, tetramethylene, hexamethylene, phenylene, cyclohexylene, methylenebisphenylene, methylenebiscyclohexylene and the groups of the structural formulas:

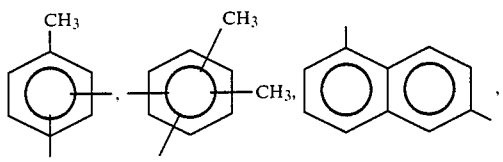

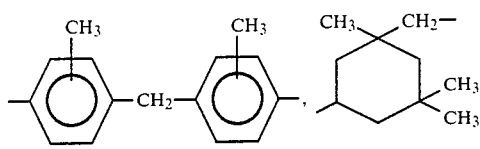

and the like.

$$-\underset{\underset{SO_3M}{|}}{R_{11}}-  \quad (VIII)$$

wherein $R_{11}$ represents a trivalent aliphatic, alicyclic or aromatic group having 2 to 20, preferably 2 to 17, carbon atoms such as

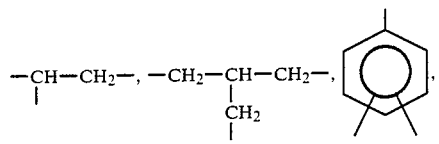

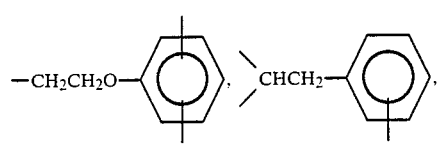

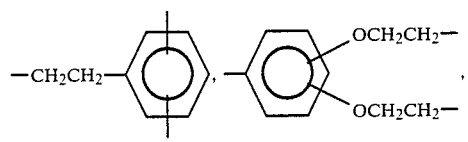

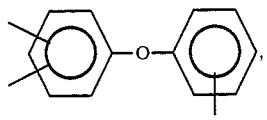

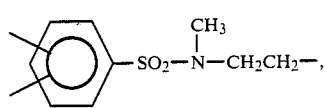

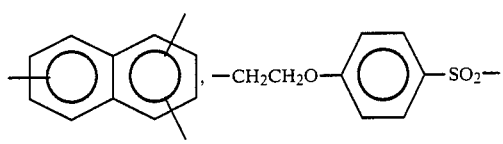

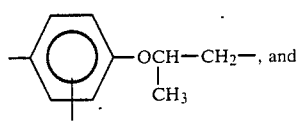

-continued

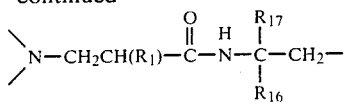

(wherein $R_1$ is as defined in the general formula (I); and $R_{16}$ and $R_{17}$, which may be identical or different, represent a hydrogen atom or a $C_1$ to $C_8$, preferably $C_1$ to $C_3$, alkyl group such as methyl, ethyl, propyl, butyl, pentyl, hexyl, heptyl and octyl group),

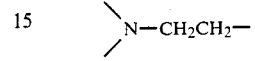

and the like, and these aliphatic, alicyclic and aromatic groups, as exemplified above, may have —O—,

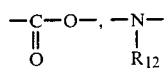

(wherein $R_{12}$ represents a hydrogen atom or a $C_1$ to $C_8$ aliphatic, alicyclic or aromatic group such as methyl, ethyl, propyl, butyl, amyl, phenyl, benzyl, cyclohexyl, cyclopentyl and the like which may be substituted by a hydroxyl group or the like),

or —SO$_2$— in their structure; and M represents a hydrogen atom, ammonium group, alkali metal atom or alkaline earth metal atom.

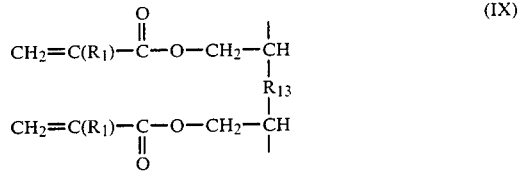

(IX)

wherein $R_1$ is as defined in the general formula (I), and $R_{13}$ represents a divalent aliphatic, alicyclic or aromatic group with or without substituent groups such as

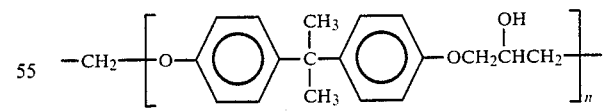

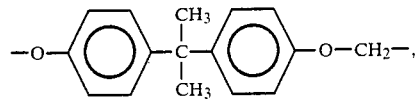

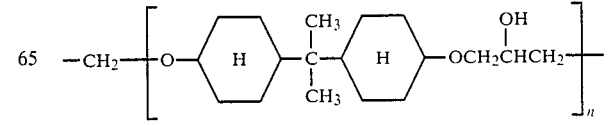

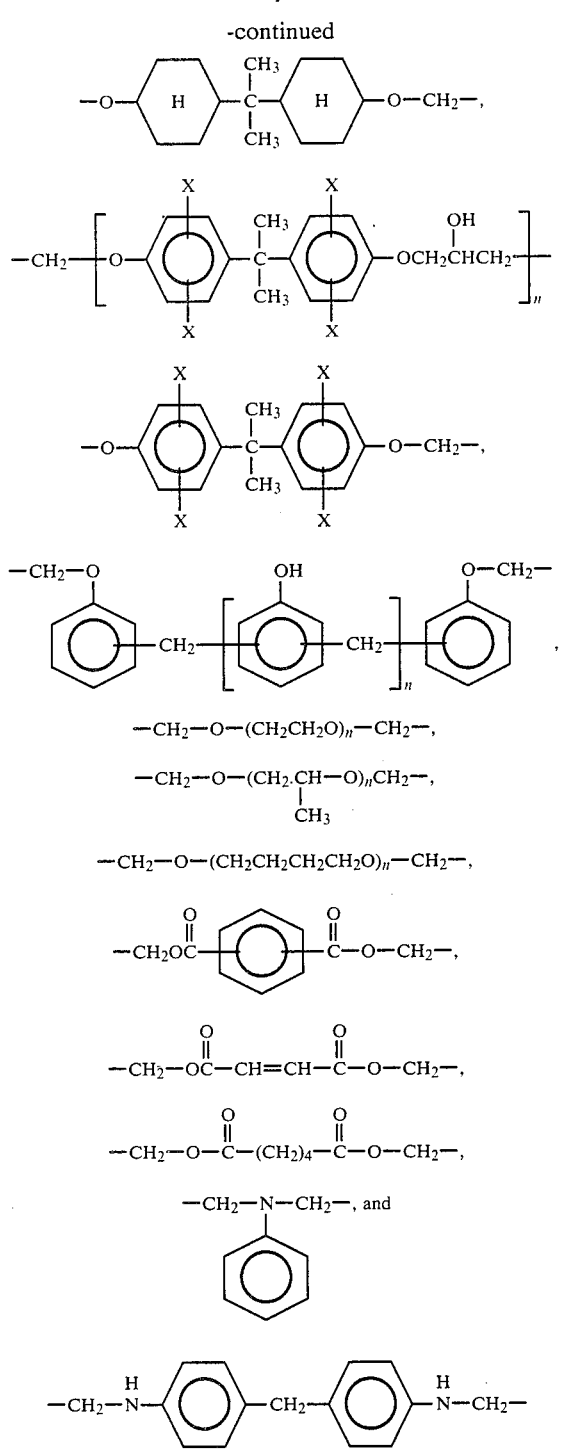

(wherein n represents an integer of 0 to 20, and X represents a fluorine, chlorine or bromine atom), and these aliphatic, alicyclic and aromatic groups, as exemplified above, may have —O—, $$-\underset{\underset{O}{\|}}{C}-O-\quad \text{or} \quad -\underset{\underset{R_{14}}{|}}{N}-$$

(wherein $R_{14}$ represents a hydrogen atom or a $C_1$ to $C_8$ aliphatic, alicyclic or aromatic group such as methyl, ethyl, propyl, butyl, amyl, phenyl, benzyl, cyclohexyl, cyclopentyl and the like which may be substituted by hydroxyl groups or the like) in their molecule.

$$\underset{HOOC}{\overset{-R_{15}-}{\diagdown}}\underset{COOH}{\diagup} \qquad (X)$$

wherein $R_{15}$ represents a tetravalent aliphatic, alicyclic or aromatic group having 2 to 40, preferably 2 to 20, more preferably 2 to 13, carbon atoms such as those represented by the structural formulas:

$$-CH_2-\underset{|}{CH}-\underset{|}{CH}-CH_2-,$$

$$-CH_2-\underset{|}{CH}-CH_2-\underset{|}{CH}-CH_2-,$$

(structures shown)

(XI) $-CH_2-\underset{\underset{OH}{|}}{CH}-R_{13}-\underset{\underset{OH}{|}}{CH}-CH_2-$ and the like.

wherein $R_{13}$ is as defined in the general formula (IX).

Three exemplary processes for preparing the polymer used in the coating material for use in radiation curing of the invention will now be described.

PROCESS A

A polymer used in the invention can be prepared by reacting at least one bifunctional compound selected from diols and diamines with a compound having in its molecule the structural unit of the general formula (IX) and two hydroxyl groups (hereinafter referred to as "Specified Hydroxyl Compound") and a diisocyanate compound to produce a polymer having isocyanate groups on the ends of its molecule and linked by urethane linkages and, optionally, urea linkages, then reacting part of the isocyanate groups of the polymer with an acrylic or methacrylic compound having a hydroxyl group to combine the reactants by urethane linkages, and subsequently reacting the residual isocyanate groups of the resultant reaction product with a compound having in its molecule the structural unit of the general formula (VIII) and two functional groups selected from hydroxyl groups, primary amino groups and secondary amino groups (hereinafter referred to as "Specified Sulfonic Acid Compound") and, optionally, with a compound having in its molecule the structural unit of the general formula (X) and two functional groups selected from hydroxyl groups, primary amino groups and secondary amino groups (hereinafter referred to as "Specified Carboxyl Compound") and/or a compound having in its molecule the structural unit of the general formula (XI) and two secondary amino groups (hereinafter referred to as "Specified Amine Adduct") to combine the reactants via urethane linkages, urea linkages or N-substituted urea linkages.

PROCESS B

A polymer used in the invention can be prepared by reacting at least one bifunctional compound selected from diols and diamines with a Specified Hydroxyl Compound and a diisocyanate compound to produce a polymer having two functional groups selected from hydroxyl groups, primary amino groups and secondary amino groups on the ends of its molecule and linked by urethane linkages and, optionally, urea linkages, then reacting the polymer with a dicarboxyl compound having the structural unit of the general formula (XIII) in its molecule or an acid anhydride thereof and, optionally, with a tetracarboxylic acid dianhydride having the structure of $R_{15}$ of the general formula (X) to combine the reactants via ester linkages or amide linkages, thereby lengthening the chain of the polymer, and subsequently reacting the terminal hydroxyl, primary amino and/or secondary amino groups of the chain-lengthened polymer with an acrylic or methacrylic compound having a carboxyl, epoxy or acid halide group to combine the reactants via ester linkages or amide linkages.

PROCESS C

A polymer used in the invention can be prepared by reacting a Specified Sulfonic Acid Compound and optionally a Specified Carboxyl Compound, at least one bifunctional compound selected from diols and diamines, a Specified Hydroxyl Compound, and a diisocyanate compound to produce a polymer linked by urethane linkages and, optionally, urea linkages, then reacting part or all of the residual isocyanate groups of the polymer with an acrylic or methacrylic compound having a hydroxyl group to combine the reactants via urethane linkages, and, where the reaction product has residual isocyanate groups, reacting the residual isocyanate groups with a Specified Amine Adduct to combine the reactants via urea linkages or N-substituted urea linkages.

The diols used in the above processes include, for example, polyester diols, polyether diols, polycaprolactam diols, polycarbonate diols and the like. The polyester diols include, for example, the polyester diols prepared by reacting a polyvalent alcohol such as ethylene glycol, polyethylene glycol, propylene glycol, polypropylene glycol, tetramethylene glycol, polytetramethylene glycol, 1,6-hexanediol, neopentyl glycol and 1,4-cyclohexanedimethanol with a polybasic acid such as phthalic acid, isophthalic acid, terephthalic acid, maleic acid, fumaric acid, adiptic acid and sebacic acid. The polyether diols include, for example, polyethylene glycol, polypropylene glycol, polytetramethylene glycol, alkylene oxide adducts of bisphenol and the like.

The diamines include, for example, diamines such as ethylenediamine, tetramethylenediamine, hexamethylenediamine, p-phenylenediamine, 4,4'-diaminodiphenylmethane and the like; diamines containing hetero-atoms; polyetherdiamine, etc.

The diisocyanate compounds include 2,4-toluene diisocyanate, 2,6-toluene diisocyanate, 1,3-xylene diisocyanate, 1,4-xylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, hexamethylene diisocyanate, isophorone diisocyanate, dicyclohexylmethane diisocyanate, methylene bis(4-cyclohexyl isocyanate) and the like.

The acrylic or methacrylic compounds having hydroxyl groups include, for example, 2-hydroxyethyl acrylate and methacrylate, 2-hydroxypropyl acrylate and methacrylate, 2-hydroxyoctyl acrylate and methacrylate, pentaerythritol triacrylate and trimethacrylate, glycerol diacrylate and dimethacrylate, dipentaerythritol monohydroxy pentaacrylate and pentamethacrylate and the like.

The acrylic or methacrylic compounds having carboxyl groups include acrylic acid, methacrylic acid and the like.

The acrylic or methacrylic compounds having epoxy groups include glycidyl esters of acrylic acid and methacrylic acid and the like.

The acrylic or methacrylic compounds having acid halide groups include acrylic acid halides and methacrylic acid halides such as acrylic acid chloride, methacrylic acid chloride, acrylic acid bromide, methacrylic acid bromide, and the like.

The tetracarboxylic acid dianhydrides having the structural unit of $R_{15}$ in the general formula (X) include, for example, aliphatic tetracarboxylic acid dianhydrides such as 1,2,3,4-butanetetracarboxylic acid dianhydride, 1,2,4,5-pentanetetracarboxylic acid dianhydride and the like, alicyclic tetracarboxylic acid dianhydrides such as 1,2,3,4-cyclopentanetetracarboxylic acid dianhydride, 1,2,4,5-cyclohexanetetracarboxylic acid dianhydride and the like, the aromatic tetracarboxylic acid dianhydrides such as pyromellitic dianhydride, benzophenonetetracarboxylic acid dianhydride and the like.

The dicarboxyl compounds or acid anhydrides thereof having the structural unit of the general formula (VIII) in its molecule include sulfosuccinic acid, sulfophthalic acid, sulfophthalic acid anhydride, sulfoterephthalic acid, sulfoisophthalic acid, sulfopropoxyisophthalic acid, sulfoethoxyisophthalic acid, sodium salts, potassium salts, ammonium salts, lithium salts, calcium salts, magnesium salts, barium salts and strontium salts of these compounds and the like.

The specified carboxyl compounds can be synthesized by reacting one mole of at least one compound selected from diols, diamines and aminoalcohols with less than one mole of a tetracarboxylic acid dianhydride to form an ester or an amide, followed by continuing addition polymerization until the acid number of the whole system has reached ½ of the initial value. The aminoalcohols used herein include, for example, monoethanolamine, monoisopropanolamine, diglycolamine and the like. The diols and diamines used herein are the same as above. The degree of polymerization in the ester-forming or amide-forming addition polymerization can be controlled by varying the mole numbers of the diol, diamine or aminoalcohol and the tetracarboxylic acid dianhydride reacted, whereby the content of the structural unit of the general formula (X) in the polymer can be determined. The temperature of the ester-forming or amide-forming addition polymerization is 40° C. to 200° C., preferably 60° C. to 130° C. As a catalyst for the reaction, there can be used bases with pyridine, triethylamine and the like and acids such as sulfonic acid, p-toluenesulfonic acid and the like.

The specified hydroxyl compounds can be synthesized by reacting 1 mole of a diepoxy compound having 2 epoxy groups in one molecule with 1 mole or more of at least one compound selected from acrylic or methacrylic compounds having carboxyl groups and acrylic or methacrylic compounds having hydroxyl groups and continuing addition polymerization until the epoxy groups in the reaction system have completely disappeared. The diepoxy compound usable herein include, for example, glycidyl ethers of polyhydric phenols prepared by reacting a polyhydric phenol such as Bisphenol A, halogenated Bisphenol A, hydrogenated Bisphenol A, Bisphenol F, catechol, resorcinol and the like with epichlorohydrin; glycidyl ethers of polyhydric alcohols prepared by reacting epichlorohydrin with a polyhydric alcohol such as ethylene glycol, polyethylene glycol, propylene glycol, polypropylene glycol, tetramethylene glycol, polytetramethylene glycol and the like; glycidyl esters of polybasic acids prepared by reacting epichlorohydrin with a polybasic acid such as phthalic acid, isophthalic acid, terephthalic acid, maleic acid, adipic acid and the like; epoxy novolac resins prepared by reacting epichlorohydrin with novolac type phenolic resins; glycidylamines prepared by reacting epichlorohydrin with a polyamine such as aniline, 4,4′-diaminodiphenylmethane and the like; alicyclic epoxy compounds such as vinylcyclohexene dioxide, dicyclopentadiene dioxide, 3,4-epoxycyclohexylmethyl 3,4-epoxycyclohexanecarboxylate, bis(3,4-epoxycyclohexylmethyl)phthalate and the like; and epoxidized polybutadienes.

The above-mentioned addition-polymerization reaction is carried out at a temperature of 20° to 130° C., preferably 40° to 70° C. As the catalyst for the reaction, can be used tertiary amines, imidazoles, metallic salts of organic acids, Lewis acids, amine complexes and the like, among which preferred are triethanolamine, N,N,N′,N′-tetramethylethylenediamine, N,N-dimethylpiperazine, N-methylmorpholine and boron trifluoride etherate. These catalysts are used in an amount of 0.01 to 5 parts by weight per 100 parts by weight of the starting materials of the reaction.

The specified amine adduct can be obtained by reacting a diepoxy compound with at least equivalent quantity, to the epoxy group of said diepoxy compound, of ammonia or a primary amine either in the absence of catalyst or in the presence of at least one compound selected from water, alcohol, phenol and the like, for example, at a temperature of from room temperature to 150° C. As the diepoxy compounds used herein, the same ones as the above-mentioned ones can be referred to. The primary amine usable herein include, for example, aliphatic amines such as ethylamine, propylamine, butylamine, amylamine and the like; aromatic amines such as aniline, benzylamine and the like; alicyclic amines such as cyclopentylamine, cyclohexylamine and the like; and aminoalcohols such as monoethanolamine, monoisopropanolamine and the like. The catalysts usable in this reaction include water, aliphatic alcohols, phenols, p-toluenesulfonic acid and organic acids such as salicylic acid, formic acid, oxalic acid, acetic acid and the like.

The specified sulfonic acid compound can be obtained by reacting one mole of at least one compound selected from diols, diamines and aminoalcohols with less than one mole of at least one selected from dicarboxyl compounds or acid anhydrides thereof having the structural unit of the general formula (VIII) in its molecule and dialkyl esters such as dimethyl esters, diethyl esters and the like thereof to carry out esterification, amide-forming reaction or ester interchange. The degree of polymerization in the addition polymerization by the esterification, amide-forming reaction or ester interchange can be controlled by varying the mole numbers of the starting materials used for reaction, whereby the content of the structural unit of the general formula (VIII) in the specified sulfonic acid compound can be determined. The temperature of the addition polymerization by the esterification, amide-forming reaction or ester interchange is 40° to 220° C., preferably 50° to 180° C. As a catalyst for the esterification or amide-forming reaction, there can be used bases such as pyridine, triethylamine and the like or acids such as sulfonic acid, p-toluenesulfonic acid and the like. Catalysts which can be used for the ester interchange include, in addition to the catalysts usable for the esterification or amide-forming reaction, salts or organic carboxylic acids such as sodium acetate, manganese acetate, zinc acetate, calcium acetate and the like, alkali metal hydroxides such as sodium hydroxide, potassium hydroxide and the like, alkali metal alcoholates such as sodium methylate, sodium ethylate and the like, oxides or hydroxides of alkaline earth metals, zinc oxide, organotitanium compounds such as titanium isopropylate and titanium butylate, etc.

The diols, diamines, aminoalcohols and the dicarboxyl compounds or acid anhydrides thereof having the structural unit of the general formula (VIII) in its molecule used herein are the same as exemplified above.

The specified sulfonic acids can be obtained by subjecting to addition reaction one mole of 2-acrylamido-2,2-dialkylethanesulfonic acid, 2-methacrylamido-2,2-dialkylethanesulfonic acid, 2-acrylamido-2-alkylethanesulfonic acid, 2-methacrylamido-2-alkylethanesulfonic acid, 2-acrylamidoethanesulfonic acid or 2-methacrylamidoethanesulfonic acid (hereinafter referred to as "(Meth)acrylamidoethanesulfonic Acid or the Like") and one mole of dihydroxyalkylamine. The temperature of the addition reaction is 20° to 100° C., preferably 30° to 60° C. The reaction may be carried out by using a catalyst, for example, alkali metal hydroxides such as sodium hydroxide, potassium hydroxide and the like, alkali metal salts or alkaline earth metal salts such as potassium carbonate, magnesium sulfate and the like, tertiary amines such as pyridine, α-picoline and the like, metallic sodium, copper acetate, etc. Prior to the reaction, the (meth)acrylamidoethanesulfonic acid may be neutralized in the presence of an alkali such as sodium hydroxide, sodium carbonate and the like.

Further, N,N-bis(2-hydroxyethyl)-2-aminoethanesulfonic acid can also be used directly in the reaction for producing the polymer as a specified sulfonic acid compound.

The alkyl group in the (meth)acrylamidoethanesulfonic acid or the like mean a $C_1$ to $C_8$, preferably $C_1$ to $C_3$, alkyl group such a methyl, ethyl, propyl, butyl, pentyl, hexyl, heptyl, octyl and the like, and the alkyl groups in dihydroxyalkylamine include, for example, alkyl groups such as ethyl, isopropyl and the like.

A preferred embodiment of the abovementioned Process A will now be described.

In the reaction of at least one bifunctional compound selected from diols and diamines with a specified hydroxyl compound and a diisocyanate compound, the specified hydroxyl compound is used in an amount of 0.01 to 5 moles, preferably 0.03 to 3 moles per 1 mole of the bifunctional compound, and the total of the bifunctional compound and the specified hydroxyl compound is 0.1 to 0.9 mole, preferably 0.5 to 0.9 mole per 1 mole of the diisocyanate compound. Usually, a catalyst such as copper naphthenate, cobalt napthenate, zinc naphthenate, n-butyltin laurate, triethylamine and the like is used in an amount of 0.01 to 1 part by weight per 100 parts by weight of the total weight of bifunctional compound, specified hydroxyl compound and diisocyanate compound. The reaction temperature is usually 30° C. to 80° C. In the next step, the polymer formed by the above reaction is reacted with an acrylic or methacrylic compound having a hydroxyl group. In this reaction, said acrylic or methacrylic compound is used in an amount of 0.1 to 20 parts by weight, preferably 0.2 to 10 parts by weight per 100 parts by weight of the polymer and the same catalyst as above is used in an amount of 0.01 to 1 part by weight per 100 parts by weight of the polymer. The reaction is carried out at 30° C. to 80° C. Then, the reaction product is further reacted with the specified sulfonic acid compound and, optionally, at least one compound selected from the specified carboxyl compound and the specified amine adduct. The amount of the specified sulfonic acid compound used is 0.1 to 20 parts by weight, preferably 0.3 to 10 parts by weight, per 100 parts by weight of said reaction product, and the amount of the specified carboxyl compound and/or the specified amine adduct is not more 30 parts by weight per 100 parts by weight of said reaction product. The same catalyst as above is used in an amount of 0.01 to 1 part by weight per 100 parts by weight of the polymer, and the reaction temperature is 30° to 80° C.

A preferred embodiment of the abovementioned Process B will now be described.

In the reaction of at least one bifunctional compound selected from diols and diamines with the specified hydroxyl compound and the diisocyanate compound, the specified hydroxyl compound is used in an amount of 0.01 to 5 moles, preferably 0.03 to 3 moles, per 1 mole of the bifunctional compound. The diisocyanate compound is used in an amount of 0.1 to 0.9 mole, preferably 0.5 to 0.9 mole, per 1 mole of the total amount of the bifunctional compound and the specified hydroxyl compound. In this reaction, the reaction conditions, the catalyst and the like may be the same as in Process A. To 100 parts by weight of the thus obtained polymer, is added 0.1 to 20 parts by weight of a dicarboxyl compound or an acid anhydride thereof having the structural unit of the general formula (VIII) in its molecule, and to the mixture is optionally added not more than 30 parts by weight of a tetracarboxylic acid dianhydride having the structure of $R_{15}$ in the general formula (X) and reaction is effected at a temperature of 20° to 180° C., either in the presence of or in the absence of, for example, 0.01 to 10% by weight of a catalyst of a base such as pyridine and triethylamine or an acid such as sulfuric acid and p-toluenesulfonic acid. Subsequently, the polymer obtained by the above reaction is reacted with an acrylic or methacrylic compound having a carboxyl, epoxy or acid halide group. In this reaction, the acrylic or methacrylic compound is used in an amount of 0.1 to 20 parts by weight, preferably 0.2 to 10 parts by weight, per 100 parts by weight of the polymer. A base such as pyridine and triethylamine or an acid such as sulfuric acid and p-toluenesulfonic acid is used as a catalyst in an amount of 0.01 to 10 parts by weight per 100 parts by weight of the polymer, and the reaction is carried out at 20° to 120° C.

A preferred embodiment of the abovementioned Process C will now be described.

One mole of a diisocyanate compound is mixed with the specified sulfonic acid compound and, optionally, the specified carboxyl compound, and with at least one bifunctional compound selected from diols and diamines with the specified hydroxyl compound in such amounts that the total amount of the specified sulfonic acid compound, the specified carboxyl compound, the bifunctional compound and the specified hydroxyl compound is 0.1 to 0.95, preferably 0.5 to 0.9 mole, and the resultant mixture is brought into reaction in the presence of a catalyst at 30° to 80° C. The catalysts which can be used herein include copper naphthenate, cobalt naphthenate, zinc naphthenate, n-butyltin laurate, triethylamine and the like. The catalyst is used in an amount of 0.01 to 1 part by weight per 100 parts by weight of the total amount of the diisocyanate compound, the specified sulfonic acid compound and the optionally used specified carboxyl compound, the bifunctional compound and the specified hydroxyl compound.

Then, to the polymer thus obtained having isocyanate groups on the ends of its molecule, is added an acrylic or methacrylic compound having hydroxyl groups in such an amount that the hydroxyl groups is in a proportion of 0.1 to 1 mole, preferably 0.2 to 1 mole, per one equivalent of the isocyanate group of the polymer, and the reaction is effected at 30° to 80° C. in the presence of the same catalyst as above.

If the reaction product after the reaction contains residual isocyanate groups, the residual isocyanate groups are reacted with the specified amine adduct in the presence of the same catalyst as above at 30° to 80° C., whereby the polymer used in the invention can be obtained.

In producing the above-mentioned specified sulfonic acid, specified carboxyl compound or specified hydroxyl compound or in practising the Process A, B or C, a polyol having a functionality of 3 or greater may be used in combination with the diol, a polyamine having a functionality of 3 or greater may be used in combination with the diamine and a polyisocyanate having a functionality of 3 or greater may be used in combination with the diisocyanate compound, in such a way that their combined use causes no gelation of reaction product. Usually, the amount of these polyfunctional compounds usable in combination is 5 to 30 parts by weight per 100 parts by weight of the diol, diamine or diisocyanate. The diols having a functionality of 3 or greater used herein include, for example, addition product of glycerin and propylene oxide, glycerin, 1,2,3-pentanetriol, 1,2,3-butanetriol and the like. The polyamines having a functionality of 3 or greater include, for example, diethylenetriamine, 1,2,3-triaminopropane, polyoxypropyleneamine and the like. The polyisocyanate compounds having a functionality of 3 or greater include, for example, polymethylene-polyphenyl isocyanate, triphenylmethane-4,4',4"-triisocyanate and the like.

In producing the specified sulfonic compound, specified carboxyl compound, specified hydroxyl compound or specified amine adduct or in practising the Process A, B or C, a solvent inert to the reaction such as methyl ethyl ketone, cyclohexanone, tetrahydrofuran, toluene, methyl isobutyl ketone, dioxane and the like may be used, if desired.

The polymer used in the invention can be produced by any of the above-mentioned processes, and its production process is not limited to those mentioned herein.

The proportion of the structural units represented by general formulas (I), (II) and (III) in the polymer used in the invention is preferably 0.2 to 40% by weight, more preferably 0.5 to 30% by weight. If it exceeds 40% by weight, the radiation-cured coating film loses its flexibility and the mechanical properties of the coating are deteriorated. On the other hand, if it is less than 0.2% by weight, the radiation-curing cannot progress sufficiently.

In the polymer used in the invention, the proportion of the structural units represented by general formulas (IV), (V), (VI) and (VII) is preferably 60 to 95% by weight, more preferably 75 to 90% by weight. If it is less than 60% by weight, the radiation-cured coating film loses its flexibility and the mechanical properties of the coating film are deteriorated. On the other hand, if it is more than 95% by weight, the radiation-curing cannot progress sufficiently.

Among the structural units represented by general formulas (IV), (V), (VI) and (VII), preferred are those represented by the general formulas (V) and (VII).

The proportion of the structural units of general formula (VIII) in the polymer of the invention is preferably 0.1 to 20% by weight and particularly 0.3 to 10% by weight. If the proportion of the structural unit of general formula (VIII) is less than 0.1% by weight, the affinity of the coating material for inorganic compounds is insufficient, and particularly the dispersibility of magnetic powder at the time of preparing a magnetic coating material is insufficient. If the proportion of the structural unit of general formula (VIII) is more than 20% by weight, the polymer has too high a polarity. This decreases the solubility of the polymer in general-purpose solvents such as toluene, methyl ethyl ketone and the like, and it simultaneously increases the moisture-absorption of the radiation-cured coating film and thereby deteriorates the strength of the coating.

In the polymer used in the invention, the proportion of the structural unit represented by general formula (IX) is preferably 0.5 to 30% by weight, more preferably 1 to 20% by weight. If it is less than 1% by weight, the formation of crosslinkage in the coating film is insufficient after the radiation-curing, which results in a decrease in the strength of the coating film. On the other hand, if it exceeds 30% by weight, the flexibility of radiation-cured coating film is deteriorated.

The proportion of the structural units of the general formula (X) or (XI) in the polymer used in the invention, is preferably not more than 30% by weight. By incorporating these structural units, it is possible to control the affinity of the polymer for magnetic powders and the solubility of the polymer in general-purpose solvents in preparing magnetic coating materials, the moisture absorption of a radiation-cured coating and the like.

The polymer used in the invention has a molecular weight of 2,000 to 100,000. If it is less than 2,000, the strength of the radiation-cured coating film is low. If it is more than 100,000, the solution viscosity is too high at the time of preparing a coating material, which not only makes the handling troublesome but also makes it necessary to use an increased amount of solvent for the purpose of decreasing the viscosity particularly where the material is used as a magnetic coating material.

If desired, the polymer used in the invention may be used in combination with other radiation-curable polymers and/or compounds having radiation-curable unsaturated bond. Said "other radiation-curable polymers" include the following.

(1) Polymers having acrylic double bonds on its molecular ends and having a polymer skeleton constituted of polyester, polyurethane, epoxy, polyether, polycarbonate, polyamide, or the like.

(2) Polymers represented by the following general formula (a):

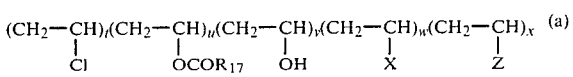

wherein $R_{17}$ is $-CH_3$ or $-C_2H_5$; X is

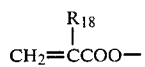

($R_{18}$ is H or $CH_3$); Z is

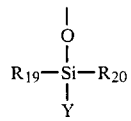

($R_{19}$ and $R_{20}$, which may be identical or different, represent $C_1$ to $C_4$ alkyl, phenyl or $C_1$ to $C_4$ alkoxy, and Y is a group having acrylic or vinyl double bond); t is an integer of 200 to 800; u is an integer of 10 to 200; v is an integer of 0 to 200; w is an integer of 3 to 100; and m is an integer of 0 to 50.

(3) Polymers such as polyester, polyether, polyurethane, epoxy, polybutadiene, polyamide, polycarbonate and the like, having two or more acrylic double bonds and at least one hydrophilic group such as $-SO_3M$, $-OSO_3M$, $-COOM$,

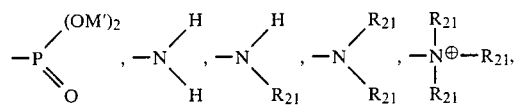

and $-OH$ wherein M is a hydrogen atom, lithium atom, sodium atom or potassium atom; M' is a hydrogen atom, lithium atom, sodium atom, potassium atom or a hydrocarbon group; and $R_{21}$ is a hydrocarbon group.

(4) Polymers represented by the following general formula (b):

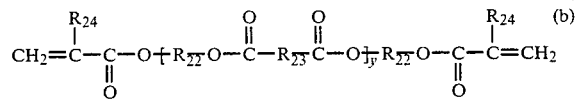

wherein $R_{22}$ and $R_{23}$ represent an aliphatic, alicyclic or aromatic hydrocarbon group or a residue derived therefrom, provided that $R_{22}$ optionally has $-O-$ linkage and $R_{23}$ mentioned later, a radiation-curable property to an epoxy polymer phenoxy resin obtained by reacting Bisphenol A or brominated Bisphenol A with epichlorohydrin or methylepichlorohydrin.

(9) Polymers prepared by giving a radiation-curable property to a cellulosic polymer such as nitrated cotton, cellulose acetobutyrate, ethylcellulose, butylcellulose, acetylcellulose and the like by the technique mentioned later.

(10) Polymer prepared by giving a radiation-curable property to polyfunctional polyethers such as a polyether having one or more hydroxyl groups, and the like, by the technique mentioned later.

(11) Polymers prepared by giving a radiation-curable property to polyfunctional polyesters such as polycaprolactone and the like by the technique mentioned later.

(12) Polymers prepared by giving a radiation-curable property to a vinyl chloride-vinyl acetate-vinyl alcohol copolymer, a vinyl chloride-vinyl alcohol copolymer, a vinyl chloride-vinyl acetate-maleic acid copolymer, a vinyl chloride-vinyl propionate-vinyl alcohol copolymer or the like by the technique mentioned later.

(13) Polymers prepared by giving a radiation-curable property to a polyether-ester polymer, a polyvinyl pyrrolidone polymer, a polyvinyl pyrrolidone-olefin copolymer, a polyamide polymer, a polyimide polymer, a phenolic polymer, a spiroacetal polymer, an acrylic polymer containing at least one member selected from hydroxyl group-containing acrylic and methacrylic esters as its polymer component, or the like by the technique mentioned later.

(14) Polymers prepared by giving a radiation-curable property to a butadiene polymer, a styrene-butadiene copolymer, an acrylonitrile-butadiene copolymer or the like having hydroxyl or carboxyl groups on molecular ends by the technique mentioned later.

(15) Acrylonitrile-butadiene copolymers, butadiene polymers, styrene-butadiene copolymers, isoprene polymers, acryl rubbers, chlorinated rubbers, and epoxy-modified rubbers.

(16) Conjugated diene polymers such as polybutadiene, polyisoprene and the like.

(17) Polymers prepared by adding $\alpha,\beta$-ethylenically unsaturated monocarboxylic acid to epoxidized diene polymers.

(18) Polymers prepared by adding $\alpha,\beta$-ethylenically unsaturated monocarboxylic acid to epoxy group of the polymers or copolymers of glycidyl acrylate or glycidyl methacrylate.

Next, specific examples of the above-mentioned technique for giving a radiation-curable property will be described.

(I) One mole of the above-mentioned thermoplastic polymer having hydroxyl groups in its molecule or a prepolymer thereof is reacted with one mole or more of the isocyanate group of a polyisocyanate compound and then with one mole or more of a monomer having a functional group reactive with the isocyanate group and a radiation-curable unsaturated double bond. The monomers having a functional group reactive with the isocyanate group and a radiation-curable unsaturated double bond include ester monomers having hydroxyl group such as 2-hydroxyethyl esters, 2-hydroxypropyl esters, 2-hydroxyoctyl esters and the like of acrylic acid and methacrylic acid; monomers having an active hydrogen atom reactive with the isocyanate group and having an acrylic double bond, such as acrylamide, methacrylamide, N-methylolacrylamide and the like; and monomers having an active hydrogen atom reactive with isocyanate group and having a radiation-curable unsaturated double bond, such as allyl alcohol, polyhydric alcohol esters of maleic acid, mono- or di-glycerides of long chain fatty acids having an unsaturated double bond, and the like.

(II) One mole of the above-mentioned thermoplastic polymer having hydroxyl groups in its molecule or a prepolymer thereof is reacted with one mole or more of an acid or an acid chloride having a radiation-curable unsaturated double bond to introduce the double bond via ester linkage. Examples of said acid halide having radiation-curable unsaturated double bond include acrylic acid, methacrylic acid, methacrylic acid chloride, acrylic acid chloride, acrylic acid bromide, methacrylic acid bromide, and the like.

(III) One mole of the above-mentioned thermoplastic polymer having carboxyl group in its molecule or a prepolymer thereof is reacted with one mole or more of a monomer having a functional group reactive with the carboxyl group and a radiation-curable unsaturated double bond. Examples of said monomer having a functional group reactive with the carboxyl group and a radiation-curable unsaturated double bond include glycidyl acrylate, glycidyl methacrylate and the like.

The above-mentioned "other radiation-curable polymers" may be used in combination of two or more members. Usually, they are used in an amount of 400 parts by weight or less per 100 parts by weight of the polymer constituting the characteristic feature of the invention.

Examples of said compound having a radiation-curable double bond include acrylic acid and acrylic esters such as acrylic acid, ethyl acrylate, propyl acrylate, trimethylolpropane triacrylate, pentaerythritol triacrylate, hydroxyethyl acrylate, phenoxyethyl acrylate, 2-ethylhexyl acrylate, dibromopropyl acrylate, triethylene glycol diacrylate, tetraethylene glycol diacrylate, trimethylolpropane triacrylate, pentaerythritol triacrylate, adduct of isophorone-diisocyanate and hydroxyethyl acrylate, trishydroxyethyl isocyanurate triacrylate and the like; acrylamides such as acrylamide, N-methylacrylamide and the like; methacrylic acid; methacrylic esters such as ethyl methacrylate, propyl methacrylate, trimethylolpropane trimethacrylate, pentaerythritol trimethacrylate, hydroxyethyl methacrylate, phenoxyethyl methacrylate, 2-ethylhexyl methacrylate, dibromopropyl methacrylate, triethylene glycol dimethacrylate, tetraethylene glycol dimethacrylate, trimethylolpropane trimethacrylate, pentaerythritol trimethacrylate, trishydroxyethyl isocyanurate trimethacrylate and the like; methacrylamides such as methacrylamide, N-methylmethacrylamide and the like; vinylpyrrolidone; and phosphoric esters having a radiation-curable unsaturated bond. The compounds having a radiation-curable unsaturated bond can be used in combination of two or more members, and they are used preferably in an amount of 5 to 90 parts by weight, more preferably in an amount of 10 to 80 parts by weight per 100 parts by weight of the polymer constituting the characteristic feature of the invention.

The magnetic powders to be mixed into the radiation-curable coating material of the invention when the latter is used as a magnetic coating material, include $\gamma$-$Fe_2O_3$, $Fe_3O_4$, iron oxide having an intermediate oxidation state between $\gamma$-$Fe_2O_3$ and $Fe_3O_4$, Co-containing $\gamma$-$Fe_2O_3$, Co-containing $Fe_3O_4$, Co-containing iron oxide having an intermediate oxidation state between Co-containing $\gamma$-$Fe_2O_3$ and Co-containing $Fe_3O_4$, the latter iron oxide additionally containing a metallic element such as transition metal element and the like, the latter iron oxide having on its surface a coating layer composed mainly of Co oxide or Co hydroxide, $CrO_2$, $CrO_2$ of which surface has been reduced to form a $Cr_2O_3$ layer, elementary metals such as Fe, Co, Ni and the like, alloys of these metals, alloys of these metals additionally containing other metallic element, transition metal element and the like, and so on. These magnetic powders are used usually in an amount of 200 to 700 parts by weight per 100 parts by weight of the polymer constituting the characteristic feature of the invention.

The solvents which can be used in preparing the radiation-curable coating material of the invention include ketones such as acetone, methyl ethyl ketone, methyl isobutyl ketone, cyclohexanone and the like; esters such as ethyl formate, ethyl acetate, butyl acetate and the like; alcohols such as methanol, ethanol, isopropanol, butanol and the like; aromatic hydrocarbons such as toluene, xylene, ethylbenzene and the like; aliphatic hydrocarbons such as hexane, heptane and the like; and glycol ethers such as ethylene glycol dimethyl ether, ethylene glycol monoethyl ether, dioxane and the like. These solvents are used singly or in combination, usually in an amount of 200 to 2,500 parts by weight per 100 parts by weight of the polymer constituting the characteristic feature of the invention.

In preparing the radiation-curable coating material of the invention, a dispersant such as caprylic acid, capric acid, lauric acid, myristic acid, palmitic acid, stearic acid, oleic acid, elaidic acid, linoleic acid, linolenic acid, stearolic acid, lecithin, organotitanium compound, organosilane compound and the like; a lubricant such as molybdenum disulfide, graphite, silicone oil and the like; an abrasive such as aluminum oxide, chromium oxide, silicon oxide and the like; an electrically conductive fine powder such as carbon black-graft polymer and the like; a natural surfactant such as saponin and the like; a nonionic surfactant of alkylene oxide type, glycerin type, glycidol type or the like; a cationic surfactant such as higher alkylamines, quaternary ammonium salts, pyridine, phosphoniums, sulfoniums and the like; anionic surfactants having acidic group such as carboxyl group, sulfonic acid group, phosphoric acid group, sulfuric ester group, phosphoric ester group and the like; amphoteric surfactants such as amino acids, aminosulfonic acids, aminoalcohol sulfates or phosphates, and the like; antistatic agent such as carbon black and the like; and rustproofing agent such as phosphoric acid, sulfamide, pyridine, dicyclohexylamine nitrite, cyclohexylammonium carbonate and the like may be compounded into the coating material.

Further, if desired, polyvinyl butyral, polyvinyl acetal, polyurethane, polyester, polyester having sulfonic acid group and/or metallic base in its molecule, epoxy resin, epoxy-urethane resin, polyvinyl chloride, vinyl chloride-vinyl acetate copolymer, hydroxyl group-containing vinyl chloride-vinyl acetate copolymer, vinyl chloride-vinyl propionate copolymer, hydroxyl group-containing vinyl chloride-vinyl propionate copolymer, vinyl chloride-vinyl acetate-acrylic ester copolymer, hydroxyl group-containing vinyl chloride-vinyl acetate-acrylic ester copolymer, polyvinylidene chloride, maleic acid-containing vinyl chloride-vinylidene chloride copolymer, vinyl chloride-vinylidene chloride copolymer, vinylidene chloride-acrylonitrile copolymer, vinylidene chloride-methacrylic ester copolymer, phenoxy resin, nitrocellulose, nitrated cotton, ketone resin, polymers and copolymers of acrylic acid and methacrylic acid, polymers and copolymers of acrylic ester and methacrylic ester, polyimide resin, 1,3-pentadiene resin, epoxidized 1,3-pentadiene resin, hydroxylated 1,3-pentadiene resin, polymers and copolymers of acrylonitrile, acrylic ester-acrylonitrile copolymer, methacrylic ester-acrylonitrile copolymer, phenolformaldehyde resin, phenol-furfural resin, xyleneformaldehyde resin, urea resin, melamine resin, alkyd resin, acrylonitrile-butadiene-styrene copolymer and the like may be compounded into the radiation-curable coating material of the invention.

The substrates (base film) which can be used for the production of magnetic recording media using the radiation-curable coating material of the invention as a magnetic coating material include, for example, polyesters such as polyethylene terephthalate and the like; polyolefins such as polypropylene and the like; cellulose derivatives such as cellulose triacetate, cellulose diacetate and the like; polycarbonate, polyvinyl chloride; chloride; polyimide; nonmagnetic metals such as aluminum copper and the like; and paper.

The radiations which can be used for crosslinking and curing the radiation-curable coating material of the invention include electron beam, $\gamma$-ray, neutron beam, $\beta$-ray, X-ray and the like, among which electron beam is particularly preferable from the viewpoint of the easiness to control radiation dose and the easiness to introduce the apparatus for projecting the radiation into the production process. The electron beams used for crosslinking and curing the coating film are preferably projected so that the dose of electron beam absorbed into the coating comes to 0.5 to 20 Megarad, by using an electron beam accelerator having an acceleration voltage of 100 to 750 KV, preferably 150 to 300 KV, from the viewpoint of transmitting power.

WORKING EXAMPLES

The present invention will be described more in detail below by way of working examples, but the invention is not limited to these working examples.

In the working examples below the molecular weights are those measured by the osmotic pressure method and the structures of compounds are those revealed by infrared spectrometric and NMR spectrometric analyses.

Example 1

(1) In a 1 liter flask equipped with a thermometer, a stirrer and a reflux condenser, there were placed 144 g of acrylic acid and 336 g of bisphenol A diglycidyl ether (Epikote 828, manufactured by Yuka Shell Epoxy K.K.), and the reactants were reacted at 60° C. for 6 hours. The absence of epoxy ring from the reaction product was confirmed by means of an infrared absorption spectrum. This reaction product is referred to as "Specified Hydroxyl Compound (I)".

The major structure of Specific Hydroxyl Compound (I):

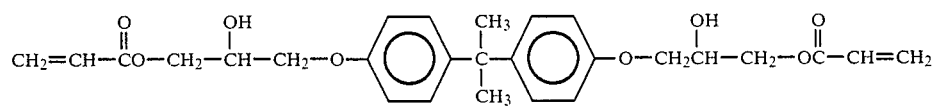

(2) In a 1 liter flask equipped with a thermometer, a stirrer and a reflux condenser, there were placed 118.4 g of dimethyl 5-sodium-sulfoisophthalate, 198.4 g of ethylene glycol and 1.64 g of sodium acetate, and the reactants were reacted at 100° C. for 4 hours. The ratio of ester interchange was 96% according to the amount of methanol which is a by-product of the reaction. (The ratio of ester interchange herein means the amount of methanol formed divided by the theoretical value). According to NMR spectroscopic analyses of the reaction product, the absence of the peak corresponding to the proton of the methyl group of dimethyl 5-sodium-sulfoisophthalate and the presence of unreacted ethylene glycol were confirmed. Further, the integral ratios of proton peaks showed that the reaction product was a mixture of the compounds of the following structural formula. The amount of the unreacted ethylene glycol was determined by liquid chromatography to be 53.5% by weight. The mixture thus obtained is referred to as "Specified Sulfonic Acid Compound (D-1)".

The major structure of Specified Sulfonic Acid Compound (D-1)

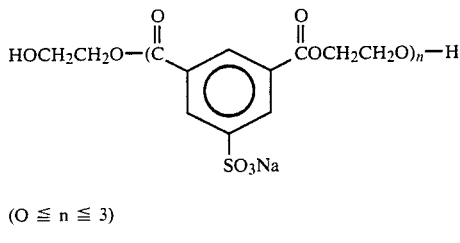

$(0 \leq n \leq 3)$

Further, gel permeation chromatography showed that the molecular weight of the reaction product was not greater than 1000 and n in the above structural formula was an integer of from 0 to 3. The hydroxyl equivalent of the Specified Sulfonic Acid Compound was $1.92 \times 10^{-2}$ mol/g, the number-average molecular weight was 104, and the content of sulfonic acid groups was found by elemental analysis to be $1.4 \times 10^{-3}$ mol/g.

(3) In a 1 liter flask equipped with a thermometer, a stirrer, a reflux condenser and a dropping funnel, there were placed 47.7 g of toluene diisocyanate, 0.2 g of dibutyltin dilaurate and 300 g of ethyl methyl ketone. While the mixture was maintained at 60° C., a mixture of 133.9 g of polyether diol (Teracol 650, manufactured by Du Pont) and 16.5 g of Specified Hydroxyl Compound (I) was dropped in with care so as to prevent the system temperature from rising. After dropping, the resultant mixture was stirred at 60° C. for 4 hours, and then 6.4 g of pentaerythritol triacrylate was added to the mixture and reaction was carried out at 60° C. for another 2 hours under stirring.

Then, 2.37 g of Specified Sulfonic Acid Compound (D-1) was added to the mixture and reaction was carried out at 60° C. for 2 hours. The absence of isocyanate group from the system was confirmed by an infrared absorption spectrum. The polymer thus obtained is referred to as "Polymer (F)".

The major structural formula and the molecular weight of Polymer (F) are shown in Table 1.

Example 2

(1) In a 1 liter flask equipped wwith a thermometer, a stirrer and a reflux condenser, there were placed 344 g of methacrylic acid, 348 g of ethylene glycol diglycidyl ether and 10 g of N-methylmorpholine, and the reactants were reacted at 60° C. for 4 hours. The absence of epoxy ring from the reaction product was confirmed by an infrared absorption spectrum. This reaction product is referred to as "Specified Hydroxyl Compound (II)".

The major structure of Specified Hydroxyl Compound (II):

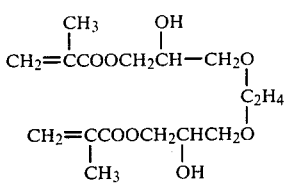

(2) In a 1 liter flask equipped with a thermometer, a stirrer, a reflux condenser and a dropping funnel, there were placed 47.2 g of 4-sodium-sulfophthalic acid and 250 g of tetrahydrofuran, and the mixture was heated to 50° C. Then, 160 g of polyoxypropylene diamine (Jeffamine D400, manufactured by Mitsui Texaco Chemical Co.) was dropped in under stirring using the dropping funnel with care so as to prevent the system temperature from rising. After dropping, the resultant mixture was stirred for 2 hours before distilling off tetrahydrofuran under reduced pressure to obtain Specified Sulfonic Acid Compound (D-II) as a viscous liquid. The amount of primary amine in Specified Sulfonic Acid Compound was measured to be $1.93 \times 10^{-3}$ equivalent/g.

The major structure of Specified Sulfonic Acid Compound (D-II):

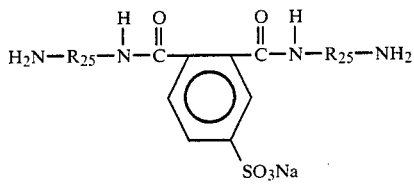

wherein $R_{25}$ represents a polyoxypropylene chain which is a residual group corresponding to polyoxypropylene diamine (Jeffamine D400, manufactured by Mitsui Texaco Chemical Company) without both terminal amino groups.

(3) In a 1 liter flask equipped with a thermometer, a stirrer, a reflux condenser and a dropping funnel, there were placed 43.6 g of pyromellitic dianhydride and 500 g of methyl ethyl ketone, and the mixture was heated to 60° C. to dissolve pyromellitic dianhydride. Thereafter, the mixture was heated to 70° C., and 195 g of polyether-diol (Tetracol 650, manufactured by Du Pont) was then slowly dropped in. After dropping, the resultant mixture was reacted at 70° C. for 6 hours and then cooled to room temperature. The acid equivalent of the reaction product was measured to be $5.4 \times 10^{-4}$ equivalent/g. The reaction product thus obtained (solid content: 32.3% by weight) is referred to as "Specified Carboxyl Compound (I)".

The major structure of Specified Carboxyl Compound (I):

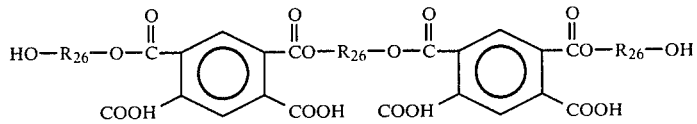

ps wherein $R_{26}$ represents a polyoxypropylene tetramethylene chain which is a residual group corresponding to polytetramethylene glycol (Teracol 650) without both terminal hydroxyl groups.

(4) In a 1 liter flask equipped with a thermometer, a stirrer, a reflux condenser and a dropping funnel, 200 g of monoethanolamine was placed and heated to 40° C. Then, a solution of 200 g of bisphenol A diglycidyl ether (Epikote 828, manufactured by Yuka Shell Epoxy K.K.) in 100 g of toluene was dropped in while maintaining the system at 40° C. After dropping, the resultant mixture was stirred for 3 hours. After distilling off toluene from the reaction system, the residue was heated at 100° C. under a reduced pressure of 1 to 3 mmHg to distill off the unreacted monoethanolamine to obtain a reaction product as white solid.

The reaction product thus obtained is referred to as "Specified Amine Adduct (I)".

The major structure of Specified Amine Adduct (I):

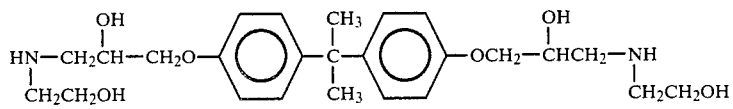

(5) In a 1 liter flask equipped with a thermometer, a stirrer, a reflux condenser and a dropping funnel, there were placed 57.6 g of methylene bis(4-cyclohexylisocyanate), 0.2 g of dibutyltin dilaurate and 300 g of methyl ethyl ketone, and the mixture was heated to 60° C. Then, from the dropping funnel, a mixture of 17.6 g of polyoxypropylenediamine (Jeffamine D400, manufactured by Mitsui Texaco Chemical Company), 110 g of polyester diol (NIPPORAN 141, manufactured by Nippon Polyurethane Industry Co., Ltd.) and 17.6 g of Specified Hydroxy Compound (II) was dropped in so as to prevent the system temperature from rising. After dropping, the resultant mixture was stirred at 60° C. for 4 hours, and 2.6 g of hydroxyethyl acrylate was added in the mixture and reaction was carried out at 60° C. for another 2 hours under stirring. Then, 11.4 g of Specified Sulfonic Acid Compound (D-II) was added to the mixture, followed by reaction at 60° C. for 2 hours. Thereafter, 26.2 g of Specified Carboxyl Compound (I) solution in methyl ethyl ketone was added and reacted at 60° C. for 7 hours. Further, 5.1 g of Specified Amine Adduct (I) was added and reacted at 60° C. for 2 hours. Upon completion of the reaction, the absence of isocyanate group from the reaction system was confirmed by an infrared absorption spectrum. The polymer thus obtained is referred to as "Polymer (G)".

The major structure and the molecular weight of Polymer (G) are shown in Table 1.

Example 3

(1) In a 1 liter flask equipped with a thermometer, stirrer, and a reflux condenser, there were placed 144 g of acrylic acid, 526 g of polyethylene glycol diglycidyl ether (Epolite 400E, manufactured by Kyoeisha Chemical Co., Ltd.) and 2 g of boron trifluoride etherate, and the reactants were reacted at 60° C. for 4 hours. The absence of the absorption by epoxy rings from the reaction product was confirmed by an infrared absorption spectrum. The reaction product is referred to as "Specified Hydroxyl Compound (III)".

The major structure of Specified Hydroxyl Compound (III):

$$CH_2=CHCOO-CH_2\overset{\overset{OH}{|}}{C}HCH_2-O-(CH_2CH_2O)_9-CH_2\overset{\overset{OH}{|}}{C}HCH_2-OOCCH=CH_2$$

(2) In a 1 liter flask equipped with a thermometer, a stirrer, a reflux condenser and a dropping funnel, there were placed 115.5 g of 2-acrylamide-2-methylpropanesulfonic acid, 20 g of sodium hydroxide and 300 g of methanol, and then 52.5 g of diethanolamine was dropped in from the dropping funnel while preventing the system temperature from exceeding 40° C. After dropping, the resultant mixture was reacted at 40° C. for 2 hours under stirring. The solvent was then distilled off under reduced pressure to obtain a reaction product as a white solid. The reaction product thus obtained is referred to as "Specified Sulfonic Acid Compounds (E-I)".

The major structure of Specified Sulfonic Acid Compound (E-I):

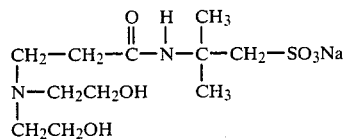

(3) In a 1 liter flask equipped with a thermometer, a stirrer, a reflux condenser and a dropping funnel, 365 g of n-butylamine was placed and heated to 40° C. Then, 268 g of polypropylene glycol diglycidyl ether (Epolite 400P, manufactured by Kyoeisha Chemical Co., Ltd.) dissolved in 100 g of tetrahydrofuran was dropped in so as to prevent the system temperature from rising. After dropping, the resultant mixture was stirred at 40° C. for 3 hours. The reaction system was then heated to 100° C. to distill off the unreacted n-butylamine to obtain a reaction product as a white solid. The reaction product thus obtained is referred to as "Specified Amine Adduct (II)".

The major structure of Specified Amine Adduct (II):

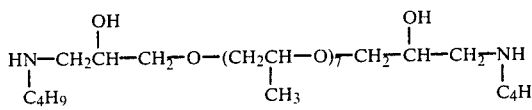

(4) In a 1 liter flask equipped with a thermometer, a stirrer, a reflux condenser and a dropping funnel, there were placed 60.0 g of 4,4'-diphenylmethane diisocyanate, 0.2 g of dibutyltin dilaurate and 300 g of methyl ethyl ketone. While the mixture was maintained at 60° C., a mixture of 120 g of polyester-diol (NIPPORAN 141, manufactured by Nippon Polyurethane Industry Co., Ltd.) and 40.2 g of Specified Hydroxy Compound (III) was dropped in from the dropping funnel with care so as to prevent the system temperature from rising.

After dropping, the resultant mixture was stirred at 60° C. for 4 hours, and then 21.0 g of dipentaerythritol triacrylate was added to the mixture, followed by reaction at 60° C. for 2 hours under stirring. Then, 6.7 g of Specified Sulfonic Acid Compound (E-I) was added and reacted at 60° C. for 2 hours. To the reaction system, 13.6 g of Specified Amine Adduct (II) was further added and reacted at 60° C. for another 2 hours. After the reaction, the absence of isocyanate group from the reaction system was confirmed by an infrared absorption spectrum. The polymer thus obtained is referred to as "Polymer H".

The structural formula and the molecular weight of polymer H are shown in Table 1.

Example 4

In a 1 liter flask equipped with a thermometer, a stirrer, a reflux condenser and a dropping funnel, there were placed 57.4 g of methylenebis(4-cyclohexylisocyanate), 0.2 g of dibutyltin dilaurate and 300 g of methyl ethyl ketone, and the mixture was maintained at 60° C. From the dropping funnel, 17.6 g of polyether-diamine (Jeffamine D400, manufactured by Mitsui Texaco Chemical Company) was dropped in with care so as to prevent the system temperature from rising. The resultant mixture was reacted at 60° C. for 1 hour. Then, a mixture of 10.6 g of Specified Hydroxyl Compound (I) and 110 g of polyester-diol (NIPPORAN 141, manufactured by Nippon Polyurethane Industry Co., Ltd.) was dropped in. After dropping, the resultant mixture was stirred at 60° C. for 2 hours, and then 6.2 g of pentaerythritol triacrylate was added thereto and the mixture was reacted at 60° C. for 2 hours. Then, 4.7 g of N,N-bis(2-hydroxyethyl)-2-aminoethanesulfonic acid was added and reacted at 60° C. for 7 hours. To the reaction system, 5.1 g of Specified Amine Adduct (I) was further added and reacted at 60° C. for 2 hours. The absence of isocyanate group from the reaction system was confirmed by an infrared absorption spectrum. The polymer thus obtained is referred to as "Polymer J".

The major structural formula and the molecular weight of Polymer J are shown in Table 1.

Example 5

(1) In a 1 liter flask equipped with a thermometer, a stirrer, a reflux condenser and a dropping funnel, there were placed 105 g of 1,2,3,4-cyclopentanetetracarboxylic acid dianhydride and 200 g of tetrahydrofuran, and the mixture was heated to 40° C. Then, 105 g (1 mol) of diglycylamine was dropped in from the dropping funnel under stirring so as to prevent the system temperature from rising. After dropping, tetrahydrofuran was immediately distilled off under reduced pressure to obtain a viscous liquid, "Specified Carboxyl Compound (II)". The acid equivalent of Specified Carboxyl Compound was measured to be $4.76 \times 10^{-3}$ equivalent/g.

The major structure of Specified Carboxyl Compound (II):

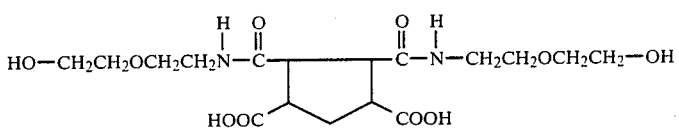

(2) In a 1 liter flask equipped with a thermometer, a stirrer, a reflux condenser and a dropping funnel, there were placed 39.2 g of toluene diisocyanate, 0.2 g of dibutyltin dilaurate and 300 g of methyl ethyl ketone. While the mixture was maintained at 60° C., a mixture of 2.7 g of ethylenediamine, 210 g of polycaprolactonepolyol (Placcel 220N-1, manufactured by Daicel Chemical Industries, Ltd.) and 14.5 g of Specified Hydroxyl Compound (I) was dropped in from the dropping funnel with care so as to prevent the system temperature from rising. After dropping, the resultant mixture was stirred at 60° C. for 2 hours, and then 3.5 g of 2-hydroxyethyl acrylate was added thereto and reacted at 60° C. for 1 hour. Then, 2.6 g of Specified Sulfonic Acid Compound (D-I) was added to the mixture, followed by reaction at 60° C. for 2 hours. To the reaction system, 2.1 g of Specified Carboxyl Compound (II) was further added and reacted at 60° C. for 7 hours. The absence of isocyanate group from the reaction system was confirmed by an infrared absorption spectrum. The polymer thus obtained is referred to as "Polymer (K)".

The major structural formula and the molecular weight of Polymer (K) are shown in Table 1.

Example 6

In a 1 liter flask equipped with a thermometer, a stirrer, a reflux condenser and a dropping funnel, there were placed 90 g of 4,4'-diphenylmethane diisocyanate, 0.2 g of dibutyltin dilaurate and 350 g of methyl ethyl ketone. While the mixture was maintained at 60° C., a mixture of 32 g of polyoxypropylene diamine (Jeffamine D400, manufactured by Mitsui Texaco Chemical Co., Ltd.), 128 g of polycarbonate diol (PC-DIOL 120-800, manufactured by PPG Co., Ltd.) and 29 g of Specified Hydroxyl Compound (I) was dropped in from the dropping funnel with care so as to prevent the system temperature from rising. After dropping, the resultant mixture was stirred at 60° C. for 2 hours, and then 2.3 g of 2-hydroxyethyl acrylate was added thereto, followed by reaction at 60° C. for 1 hour. Then, 31 g of Specified Sulfonic Acid Compound (D-II) was added and reacted at 60° C. for 2 hours. To the reaction system, 13.6 g of Specified Amine Adduct (II) was further added and reacted at 60° C. for another 2 hours. The absence of isocyanate group in the reaction system was confirmed by an infrared absorption spectrum. The polymer thus obtained is referred to as "Polymer (L)".

The major structural formula and the molecular weight of Polymer (L) are shown in Table 1.

Example 7

(1) In a 1 liter flask equipped with a thermometer, a stirrer, a reflux condenser and a dropping funnel, there were placed 43.6 g of pyromellitic dianhydride and 500 g of methyl ethyl ketone, and the mixture was heated to 60° C. to dissolve pyromellitic dianhydride. After raising the temperature of the mixture to 70° C., 100 g of polyether diamine (Jeffamine D400, manufactured by Mitsui Texaco Chemical Co., Ltd.) was added thereto so as to prevent the inner temperature for exceeding 65° C. After dropping, the resultant mixture was stirred at 60° C. for 2 hours and cooled to room temperature. The acid equivalent of the system was measured to be $6.2 \times 10^{-4}$ equivalent/g. The reaction product thus obtained (solid content: 22.3 wt.%) was referred to as "Specified Carboxyl Compound (III)".

The major structure of Specified Carboxyl Compound (III):

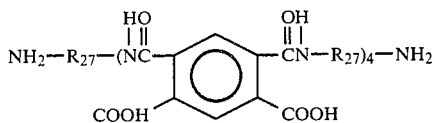

wherein $R_{27}$ is poly(oxypropylene) chain which is the residual group corresponding to polyoxypropylene diamine (Jeffamine D400) without the terminal amino groups.

(2) In a 1 liter flask equipped with a thermometer, a stirrer, reflux condenser and a dropping funnel, there were placed 62.6 of toluene diisocyanate, 0.2 g of dibutyltin dilaurate and 300 g of methyl ethyl ketone. While the mixture was maintained at 60° C., a mixture of 130 g of polyether-diol (Teracol 650, manufactured by Du Pont Co.) and 48.4 g of Specified Hydroxyl Company (I) was dropped in from the dropping funnel with care so as to prevent the system temperature from rising. After dropping, the resultant mixture was reacted at 60° C. for 4 hours. Then, 11.2 g of pentaerythritol triacrylate was added and the resultant mixture was stirred at 60° C. for 2 hours. Thereafter 6.7 g of Specified Sulfonic Acid Compound (E-I) was added thereto, followed by reaction at 60° C. for 2 hours. To the reaction system, 57.4 g of Specified Carboxyl Compound (III) was further added and reacted at 60° C. for 4 hours under stirring. The absence of isocyanate group from the reaction system was confirmed by an infrared absorption spectrum. The polymer thus obtained is referred to as "Polymer (M)".

The major structural formula and the molecular weight of Polymer (M) are shown in Table 1.

Example 8

In a 1 liter flask equipped with a thermometer, a stirrer, a reflux condenser and a dropping funnel, there were placed 120 g of polypropylene glycol (Uniol D400, manufactured by Nippon Oils & Fats Co., Ltd.), 29.0 g of Specified Hydroxyl Compound (I), 0.2 g of dibutyltin dilaurate and 300 g of methyl ethyl ketone. While the mixture was maintained at 60° C., 78.3 g of methylenebis(4-cyclohexylisocyanate) was dropped in from the dropping funnel with care so as to prevent the system temperature from rising. After dropping, the resultant mixture was stirred at 60° C. for 4 hours, and then 8.0 g of 2-sodiumsulfoterephthalic acid was added, followed by reaction at 70° C. for 6 hours. To the reaction system, 5.4 g of acrylic chloride was added and reacted at 70° C. for another 2 hours.

The polymer thus obtained is referred to as "Polymer (N)". The major structural formula and the molecular weight of Polymer (N) are shown in Table 1.

Example 9

In a 1 liter flask equipped with a thermometer, a stirrer, a reflux condenser and a dropping funnel, there were placed 3.0 g of ethylenediamine, 150 g of polyesterdiol (NIPPORAN 141, manufactured by Nippon Polyurethane Industry Co., Ltd.), 34.6 g of Specified Hydroxyl Compound (II), 0.2 g of dibutyltin dilaurate and 300 g of methyl ethyl ketone. While the mixture was maintained at 60° C., 62.5 g of 4,4'-diphenylmethane diisocyanate was dropped in from the dropping funnel with care so as to prevent the system temperature from rising. After dropping, the resultant mixture was reacted at 60° C. for 4 hours, and then 5-sodium-sulfopropoxyisophthalic acid was added thereto, followed by reaction at 70° C. for 6 hours. To the reaction system, 7.1 g of methacrylic acid glycidyl ether was further added and reacted at 60° C. for 2 hours. The polymer thus obtained is referred to as "Polymer (P)".

The major structural formula and the molecular weight of Polymer (P) are shown in Table 1.

Example 10

In a 1 liter flask equipped with a thermometer, a stirrer, a reflux condenser and a dropping funnel, there were placed 52.2 g of toluene diisocyanate, 0.2 g of dibutyltin dilaurate and 300 g of methyl ethyl ketone. After the mixture was heated to 60° C., a mixture of 168 g of polycarbonate diol (PC-DIOL 120-800, manufactured by PPG Co., Ltd.), 20.1 g of Specified Hydroxyl Compound (III) and 4.16 g of Specified Sulfonic Acid Compound (D-I) was dropped in from the dropping funnel so as to prevent the system temperature from rising. After dropping, the resultant mixture was reacted at 60° C. for 4 hours, and 2.3 g of 2-hydroxyethyl acrylate was then added thereto, followed by reaction at 60° C. for 2 hours. To the reaction system, 4.62 of Specified Amine Adduct (II) was further added and reacted at 60° C. for another 2 hours. The absence of isocyanate group from the reaction system was confirmed by an infrared absorption spectrum. The polymer thus obtained is referred to as "Polymer (Q)".

The major structural formula and the molecular weight of Polymer Q are shown in Table 1.

Example 11

In a 1 liter flask equipped with a thermometer, a stirrer, a reflux condenser and a dropping funnel, there were placed 80 g of 4,4'-diphenylmethane diisocyanate, 0.2 g of dibutyltin dilaurate and 300 g of methyl ethyl ketone. After the mixture was heated to 60° C., a mixture of 156 g of polyether diol (Teracol 650, maufactured by Du Pont), 19.4 g of Specified Hydroxyl Compound (I) and 0.6 g of Specified Sulfonic acid (D-II) was dropped in from the dropping funnel with care so as to prevent the system temperature from rising. After dropping, the resultant mixture was reacted at 60° C. for 4 hours, and then 5.6 g of pentaerythritol triacrylate was added and reacted for 2 hours at 60° C. To the reaction system, 6.8 g of Specified Amine Adduct (II) was further added and reacted at 60° C. for another 2 hours. The absence of isocyanate group from the reaction system was confirmed by an infrared absorption spectrum. The polymer thus obtained is referred to as Polymer "S". The major structural formula and the molecular weight of Polymer "S" are shown in Table 1.

TABLE 1

| Example | Structural formula | Molecular weight |
|---|---|---|
| 1 (Polymer F) | (complex structural formula) | $1.9 \times 10^4$ |
| 2 (Polymer G) | (complex structural formula) | $2.2 \times 10^4$ |
| 3 (Polymer H) | (complex structural formula) | $1.3 \times 10^4$ |

TABLE 1-continued

| Example | Structural formula | Molecular weight |
|---|---|---|
| 4 (Polymer J) | (complex structural formula not fully transcribable) | $1.9 \times 10^4$ |
| 5 (Polymer K) | (complex structural formula not fully transcribable) | $1.9 \times 10^4$ |
| 6 (Polymer L) | (complex structural formula not fully transcribable) | $3.3 \times 10^4$ |

TABLE 1-continued

| Example | Structural formula | Molecular weight |
|---|---|---|
| 7 (Polymer M) | (complex structural formula not fully transcribable) | $1.6 \times 10^4$ |
| 8 (Polymer N) | (complex structural formula not fully transcribable) | $8 \times 10^3$ |
| 9 (Polymer P) | (complex structural formula not fully transcribable) | $1.1 \times 10^4$ |
| 10 (Polymer Q) | (complex structural formula not fully transcribable) | $2.7 \times 10^4$ |

TABLE 1-continued

| Example | Structural formula | Molecular weight |
|---|---|---|
| 11 (Polymer S) | $-OCH_2CH_2OCCH=CH_2$ with $\|O$; complex structure including $CH_2=CHCOCH_2$, $CH_2=CHCO-CH_2C-CH_2O$, and repeating urethane segments containing $-OR_{29}OCNR_{39}NC-$, $-OR_{30}O-CNR_{39}NCNR_{42}NCNR_{39}NCOR_{30}-$ groups | $1.6 \times 10^4$ |

Note for Table 1
R₂₈: a residual group corresponding to toluene diisocyanate without both terminal isocyanate groups
R₂₉: a residual group corresponding to polyether diol (Teracol 650, manufactured by Du Pont) without both terminal hydroxyl groups
R₃₀: a residual group corresponding to Specified Hydroxyl Compound (I) without the terminal hydroxyl groups
R₃₀: a residual group corresponding to Specified Sulfonic Acid Compound (D-I) without both terminal hydroxyl groups
R₃₂: a residual group corresponding to methylenebis(cyclohexyl isocyanate) without both terminal isocyanate groups
R₃₃: a residual group corresponding to polyester diol (NIPPORAN 141, manufactured by Nippon Polyurethane Industry Co., Ltd.) without both terminal hydroxyl groups
R₃₄: a residual group corresponding to polyoxypropylene diamine (Jeffamine D400, Mitsui Texaco Chemical Co., Ltd.) without both terminal amino groups
R₃₅: a residual group corresponding to Specified Hydroxyl Compound (II) without both terminal hydroxyl groups
R₃₆: a residual group corresponding to Specified Sulfonic Acid Compound (D-II) without both terminal amino groups
R₁₇: A residual group corresponding to Specified Carboxyl Compound (I) without both terminal hydroxyl groups
R₃₈: a residual group corresponding to Specified Amine Adduct (I) without both terminal amino groups
R₃₉: a residual group corresponding to 4,4'-diphenylmethane diisocyanate without both terminal isocyanate groups
R₄₀: a residual group corresponding to Specified Hydroxyl Compound (III) without both terminal hydroxyl groups
R₄₁: a residual group corresponding to Specified Sulfonic Acid Compound (E-I) without both terminal hydroxyl groups
R₄₂: a residual group corresponding to Specified Amine Adduct (II) without both terminal amino groups
R₄₃: a residual group corresponding to polycaprolactone diol (Placcel 220N-1, manufactured by Daicel Chemical Industries, Ltd.) without both terminal hydroxyl groups
R₄₄: a residual group corresponding to Specified Carboxyl Compound (II) without both terminal hydroxyl groups
R₄₅: a residual group corresponding to polycarbonate diol (PC-DIOL 120-800, manufactured by PPG Co., Ltd.) without both terminal hydroxyl groups
R₄₆: a residual group corresponding to Specified Carboxyl Compound (III) without both terminal amino groups
R₄₇: a residual group corresponding to polyproplyene glycol (UNIOL D400, manufactured by Nippon Oils & Fats Co., Ltd.) without both terminal hydroxyl groups

Referential Example 1

A magnetic coating material having the following composition was prepared in the manner mentioned below using a solution of Polymer F obtained in Example 1 in methyl ethyl ketone. The coating material was applied to a substrate and cured by irradiation with electron beams.

| | |
|---|---|
| Co—containing $\gamma$-Fe$_2$O$_3$ | 80 parts by weight |
| Polymer F | 17 parts by weight (on a solids basis) |
| Trimethylolpropane triacrylate | 3 parts by weight |
| Methyl ethyl ketone | 200 parts by weight |

Among the above-mentioned components, the magnetic powder, trimethylolpropane triacrylate and methyl ethyl ketone were placed in a 500 ml aluminium can together with stainless steel balls having a diameter of 3 mm (about 20 ml), and the can was shaken for 2 hours by a paint conditioner manufactured by Red Devil Co. (USA). A solution of Polymer A in 2-butanone was then added to the mixture, and the resultant mixture was shaken for an additional 4 hours. Thereafter the steel balls were removed to obtain a magnetic coating material. The magnetic coating material was immediately applied to a polyester film (15$\mu$ in thickness) in a dried coating thickness of 6$\mu$. The coating was immediately subjected to a magnetic field orientation treatment. After drying the coating film overnight at room temperature, it was cured by means of an electrocurtain type electron beam accelerator at an acceleration voltage of 160 KV and an absorbed dose of 7 Megarad.

For comparison, the same magnetic composition as above except that it contained no magnetic powder was prepared from Polymer F, trimethylolpropane triacrylate and methyl ethyl ketone. The coating material was applied to a glass plate in a dried coating thickness of 40 to 60$\mu$. After drying the coating film overnight at room temperature, it was cured at an acceleration voltage of 160 KV and an absorbed dose of 5 Megarad.

The magnetic coating material was subjected to the following test (1), and the cured magnetic coating film was subjected to the following tests (2) to (6).

The cured coating film containing no magnetic powder was subjected to the following tests (7) to (8).

Apart from the above, still another cured coating film was prepared and subjected to the following test (9).

The results are shown in Table 2.

(1) Filtration Test: The magnetic coating material was filtered with a filter having a mean pore size of 2$\mu$ to examine its 100% filtrability within one minute.

(2) Gloss: Gloss of the cured magnetic coating film was measured at a reflexion angle of 45° using a digital gloss-meter (manufactured by Murakami Shikisai Gijutsu Kenkyujo). Symbols ⊚, ○, △ and x signify that the gloss is 70-90, 50-70, 30-50 and 30 or less, respectively.

(3) Surface: The surface of the cured magnetic coating film was examined using a scanning electron microscope. The symbol ⊚ means that no aggregation of magnetic powder was observed. Surface states of inferior appearance were expressed by symbols ○, △ and x, in the order of increasing inferiority.

(4) Adhesion Test: A pressure-sensitive adhesive tape was stuck on the surface of the cured magnetic coating film so that the tape uniformly adhered to the whole area of the coating film, and then the tape was instantaneously peeled off and the state of the coating film after peeling was visually examined. A complete peeling of the cured magnetic coating film from the substrate was expressed by symbol x; a partial peeling of the coating film from the substrate was expressed by symbol △; little peeling was expressed by symbol ○; and no peeling was expressed by symbol ⊚.

(5) Abrasion Test: The cured magnetic coating film was 20 times shaved on a #1000 Emery paper, and the amount of abraded powder was measured.

(6) Ratio of rectangular hysteresis (Br/Bm): The magnetic properties were measured in an external magnetic field of 5,000 ce using VSM-3 manufactured by Touei Kogyo K.K. "Br" denotes the residual magnetic flux density, and "Bm" denotes the maximum residual magnetic flux density.

(7) Breaking strength, Elongation and Initial Modulus: A rectangular test specimen measuring 0.5 cm × 10 cm × 40-60$\mu$ was cut out from the cured coating film. Its breaking strength, elongation and initial modulus were measured at a tensile speed of 50 mm/min at room temperature.

(8) Tetrahydrofuran (THF) Unextractable Residue: Using a Soxhlet extractor, the cured coating film was extracted with tetrahydrofuran for 24 hours to determine the ratio of unextractable residue.

(9) Bending Test: Polymer A obtained in Example 1 was applied to a polyester film (100 $\mu$m in thickness) to form a coating film with a thickness of 40 to 50$\mu$ in dry state. After drying the coating film overnight at room temperature, the resulting transparent film was cured by irradiation with electron beams at an acceleration voltage of 160 KV and a dose of 5 Megarad. The cured transparent film was cut into rectangular strips having a width of 1 cm together with the substrate polyester film. The test strips were subjected to a bending test comprising the steps of bending a strip at the middle portion while fixing its two ends and then immediately restoring to the original position. The steps were repeated 20 times in one second to examine if the transparent film showed any peeling or breakage at the bent portion. Test strips which withstood bending for 500 hours were evaluated as "excellent".

Referential Example 2

A coating material having the composition given below was subjected to the same tests as in Referential Example 1. The results are shown in Table 2.

| | |
|---|---|
| Co—containing $\gamma$-Fe$_2$O$_3$ | 80 parts |
| Polymer G | 17 parts (on a solids basis) |
| Trimethylolpropane triacrylate | 3 parts |
| Methyl ethyl ketone | 200 parts |

Referential Example 3

A coating material having the composition given below was subjected to the same tests as in Referential Example 1. The results are shown in Table 2.

| | |
|---|---|
| Co—containing $\gamma$-Fe$_2$O$_3$ | 80 parts |
| Polymer H | 17 parts (on a solid basis) |
| Trimethylolpropane triacrylate | 3 parts |
| Methyl ethyl ketone | 200 parts |

Referential Example 4

A coating material having the composition given below was subjected to the same tests as in Referential Example 1. The results are shown in Table 2.

| | |
|---|---|
| Co—containing γ-Fe$_2$O$_3$ | 80 parts |
| Polymer H | 20 parts (on a solids basis) |
| Methyl ethyl ketone | 200 parts |

Referential Example 5

A coating material having the composition given below was subjected to the same tests as in Referential Example 1. The results are shown in Table 2.

| | |
|---|---|
| Co—containing γ-Fe$_2$O$_3$ | 80 parts |
| Polymer J | 17 parts (on a solid basis) |
| Pentaerythritol triacrylate | 3 parts |
| Methyl ethyl ketone | 200 parts |

Referential Example 6

A coating material having the composition given below was subjected to the same tests as in Referential Example 1. The results are shown in Table 2.

| | |
|---|---|
| Co—containing γ-Fe$_2$O$_3$ | 80 parts |
| Polymer K | 17 parts (on a solids basis) |
| Pentaerythritol triacrylate | 3 parts |
| Methyl ethyl ketone | 200 parts |

Referential Example 7

A coating material having the composition given below was subjected to the same tests as in Referential Example 1. The results are shown in Table 2.

| | |
|---|---|
| Co—containing γ-Fe$_2$O$_3$ | 80 parts |
| Polymer L | 17 parts (on a solids basis) |
| Diethylene glycol diacrylate | 3 parts |
| Methyl ethyl ketone | 200 parts |

Referential Example 8

A coating material having the composition given below was subjected to the same tests as in Referential Example 1. The results are shown in Table 2.

| | |
|---|---|
| Co—containing γ-Fe$_2$O$_3$ | 80 parts |
| Polymer M | 17 parts (on a solids basis) |
| Trimethylolpropane triacrylate | 3 parts |
| Methyl ethyl ketone | 200 parts |

Referential Example 9

A coating material having the composition given below was subjected to the same tests as in Referential Example 1. The results are shown in Table 2.

| | |
|---|---|
| Co—containing γ-Fe$_2$O$_3$ | 80 parts |
| Polymer N | 17 parts (on a solids basis) |
| Trimethylolpropane triacrylate | 3 parts |
| Methyl ethyl ketone | 200 parts |

Referential Example 10

A coating material having the composition given below was subjected to the same tests as in Referential Example 1. The results are shown in Table 2.

| | |
|---|---|
| Co—containing γ-Fe$_2$O$_3$ | 80 parts |
| Polymer N | 20 parts (on a solids basis) |
| Methyl ethyl ketone | 200 parts |

Referential Example 11

A coating material having the composition given below was subjected to the same tests as in Referential Example 1. The results are shown in Table 2

| | |
|---|---|
| Co—containing γ-Fe$_2$O$_3$ | 80 parts |
| Polymer P | 17 parts (on a solids basis) |
| Pentaerythritol triacrylate | 3 parts |
| Methyl ethyl ketone | 200 parts |

Referential Example 12

A coating material having the composition given below was subjected to the same tests as in Referential Example 1. The results are shown in Table 2.

| | |
|---|---|
| Co—containing γ-Fe$_2$O$_3$ | 80 parts |
| Polymer Q | 17 parts (on a solids basis) |
| Diethylene glycol diacrylate | 3 parts |
| Methyl ethyl ketone | 200 parts |

Referential Example 13

A coating material having the composition given below was subjected to the same tests as in Referential Example 1. The results are shown in Table 2.

| | |
|---|---|
| Co—containing γ-Fe$_2$O$_3$ | 80 parts |
| Polymer Q | 20 parts (on a solids basis) |
| Methyl ethyl ketone | 200 parts |

Referential Example 14

A coating material having the composition as given below was subjected to the same tests as in Referential Example 1. The results are shown in Table 2.

| | |
|---|---|
| Co—containing γ-Fe$_2$O$_3$ | 80 parts |
| Polymer S | 17 parts (on a solids basis) |
| Diethylene glycol diacrylate | 3 parts |
| Methyl ethyl ketone | 200 parts |

EFFECT OF THE INVENTION

The present invention has the following effects:

(1) The cured coating film of the coating material for use in radiation curing of the invention has not only good mechanical properties but also good adhesion to substrates such as magnetic recording media, etc.

(2) The coating material for use in radiation curing of the invention, because of its good radiation crosslinkability, can be sufficiently cured by a low exposed dose of radiation to provide a highly solvent-resistant coating film; namely, the coating can be cured by a reduced amount of energy.

(3) The coating material for use in radiation curing of the invention, particularly the magnetic coating material, can be handled easily because of its low viscosity as compared with conventional coating materials, and has good leveling properties, so that a coating film having a markedly high surface smoothness can be obtained.

(4) In the case of the magnetic coating material prepared by blending the coating material for use in radiation curing of the invention with a magnetic powder, the coating material has good affinity for the magnetic powder, thereby permitting easy dispersion of the magnetic powder in the coating material and ensuring a great increase in the loadings of the magnetic powder into the coating material. Accordingly, the coating material for use in radiation curing of the invention enables preparation of a magnetic coating material capable of producing magnetic recording media having good magnetic conversion characteristics.

(5) The coating film of the coating material for use in radiation curing of the invention can be cured to have appropriate flexibility and surface hardness even where crosslink density is raised by increasing the irradiation dose of radiation. Therefore, where the coating material of the invention is used as a magnetic coating material in producing a magnetic tape, one of magnetic recording media, there can be obtained a magnetic tape which can be in good contact with the magnetic head and which is accompanied by little abrasion of the magnetic powder and little modulation noise in use and has high durability.

TABLE 2

| Referential Example No. | Magnetic coating material | | | | | | | | | |
|---|---|---|---|---|---|---|---|---|---|---|
| | Cured magnetic coating film | | | | | | Cured transparent film | | | |
| | Filtration test using 2μ filter | Gloss | Surface state | Adhesion test | Abrasion test (mg) | Ratio of rectangular hysteresis | Bending test | Strength at break (kg/cm²) | Elongation (%) | Initial modulus (kg/cm²) | THF-unextractable residue (%) |
| 1 | Filtered within 1 minute | ⊚ | ⊚ | ⊚ | 0.7 | 0.87 | Excellent | 450 | 150 | 5,700 | 97.4 |
| 2 | Filtered within 1 minute | ⊚ | ○ | | 0.8 | 0.84 | Good | 360 | 190 | 4,200 | 94.8 |
| 3 | Filtered within 1 minute | ⊚ | ⊚ | ⊚ | 0.4 | 0.86 | Excellent | 560 | 83 | 10,000 | 98.3 |
| 4 | Filtered within 1 minute | ⊚ | ⊚ | ⊚ | 0.8 | 0.87 | Excellent | 480 | 150 | 1,600 | 95.1 |
| 5 | Filtered within 1 minute | ⊚ | ⊚ | ○ | 0.7 | 0.86 | Excellent | 460 | 210 | 5,000 | 95.0 |
| 6 | Filtered within 1 minute | ⊚ | ○ | ⊚ | 0.4 | 0.84 | Good | 500 | 170 | 6,300 | 95.2 |
| 7 | Filtered within 1 minute | ⊚ | ⊚ | ⊚ | 0.5 | 0.89 | Excellent | 410 | 330 | 2,800 | 96.0 |
| 8 | Filtered within 1 minute | ⊚ | ○ | ○ | 0.8 | 0.85 | Good | 430 | 90 | 14,000 | 98.8 |
| 9 | Filtered within 1 minute | ⊚ | ⊚ | ⊚ | 0.5 | 0.88 | Good | 500 | 130 | 7,300 | 97.9 |
| 10 | Filtered within 1 minute | ⊚ | ⊚ | ○ | 1.0 | 0.87 | Good | 390 | 240 | 880 | 95.4 |
| 11 | Filtered within 1 minute | ⊚ | ○ | ⊚ | 0.6 | 0.83 | Excellent | 610 | 68 | 13,000 | 99.4 |
| 12 | Filtered within 1 minute | ⊚ | ⊚ | ⊚ | 0.4 | 0.86 | Excellent | 430 | 120 | 8,200 | 97.3 |
| 13 | Filtered within 1 minute | ⊚ | ⊚ | ⊚ | 0.8 | 0.85 | Excellent | 360 | 230 | 900 | 94.1 |
| 14 | Filtered within 1 minute | ⊚ | ⊚ | ○ | 0.9 | 0.83 | Good | 390 | 260 | 4,000 | 96.2 |

What is claimed is:

1. A radiation curable polymer having a molecular weight of 2,000 to 100,000 and having:
    (A) at least one structural unit selected from the structural units represented by the following general formulas (I), (II) and (III) on both ends of its molecule,
    (B) at least one structural unit selected from the structural units represented by the following general formulas (IV), (V), (VI) and (VII),
    (C) a structural unit represented by the following general formula (VIII),
    (D) a structural unit represented by the following general formula (IX), and optionally
    (E) at least one structural unit selected from the structural units represented by the following general formulas (X) and (XI),
wherein the structural units of the general formulas (I) to (XI) are linked by at least one linkage selected from urethane linkage, urea linkage, N-substituted urea linkage, amide linkage and ester linkage:

$$CH_2=C(R_1)- \tag{I}$$

wherein $R_1$ represents a hydrogen atom or methyl group;

$$CH_2=C(R_1)-\underset{\underset{O}{\|}}{C}-O-R_2- \tag{II}$$

wherein $R_1$ is as defined in the general formula (I), and $R_2$ represents an alkylene group having 2 to 8 carbon atoms;

$$\begin{array}{c} CH_2=C(R_1)-\underset{\underset{O}{\|}}{C}-O-CH_2 \\ \hspace{2cm} HC-, \\ CH_2=C(R_1)-\underset{\underset{O}{\|}}{C}-O-CH_2 \end{array} \tag{III}$$

$$\begin{array}{c} CH_2=C(R_1)-\underset{\underset{O}{\|}}{C}-O-CH_2 \\ CH_2=C(R_1)-\underset{\underset{O}{\|}}{C}-O-CH_2-\underset{|}{C}-CH_2- \\ CH_2=C(R_1)-\underset{\underset{O}{\|}}{C}-O-CH_2 \end{array}$$

or $$\begin{array}{cc} CH_2=C(R_1)-\underset{\underset{O}{\|}}{C}-O-CH_2 & CH_2OC(R_1)\!\!\rightarrow\!\!C=CH_2 \\ & \hspace{1cm} \| \\ & \hspace{1cm} O \\ CH_2=C(R_1)-\underset{\underset{O}{\|}}{C}OCH_2- C-CH_2OCH_2-\underset{|}{C}-CH_2- \\ CH_2=C(R_1)-\underset{\underset{O}{\|}}{C}-O-CH_2 & CH_2OC(R_1)\!\!\rightarrow\!\!C=CH_2 \\ & \hspace{1cm} \| \\ & \hspace{1cm} O \end{array}$$

wherein $R_1$ is as defined in the general formula (I)

$$\{(R_3O)_k\text{—}(R_{48}O)_l(R_4O)_m\}_n R_3\text{—} \tag{IV}$$

or $$\{(R_3O)_k\text{—}(R_{48}O)_l(R_4O)_m\}_n R_4\text{—}$$

wherein $R_3$ and $R_4$, which may be identical or different, represent an alkylene group having 2 to 6 carbon atoms; $R_{48}$ represents a divalent organic group with 13 to 18 carbon atoms having an aromatic group; k, l and m represent an integer of 0 to 50 but they are not 0 simultaneously; and n represents an integer of 0 to 50

$$\{(R_3O\!\!\rightarrow\!\!)_{l}(R_4O)_m\overset{\underset{\|}{O}}{C}\!\!-\!\!R_5\!\!-\!\!\overset{\underset{\|}{O}}{C}\!\!-\!\!O\}_p(R_3O)_{l-1}(R_4O)_{m-1}R_3\text{—} \tag{V}$$

or $$\{(R_3O\!\!\rightarrow\!\!)_{l}(R_4O)_m\overset{\underset{\|}{O}}{C}\!\!-\!\!R_5\!\!-\!\!\overset{\underset{\|}{O}}{C}\!\!-\!\!O\}_p(R_3O)_{l-1}(R_4O)_{m-1}R_4\text{—}$$

wherein $R_3$ and $R_4$ are as defined in the general formula (IV); $R_5$ represents an aliphatic, alicyclic or aromatic divalent group having 2 to 8 carbon atoms; l and m are as defined in the general formula (IV); and p represents an integer of 1 to 50

$$-\!\!\{(R_2O)_q\overset{\underset{\|}{O}}{C}\!\!-\!\!O\}_r R_2\text{—} \tag{VI}$$

or $$\left[\!\!\begin{array}{c}\phantom{x}\\ \text{aromatic carbonate structure}\\ \phantom{x}\end{array}\!\!\right]_s$$

wherein $R_2$ is as defined in the general formula (II); $R_6$, $R_7$, $R_8$ and $R_9$, which may be identical or different, represent a hydrogen atom or an aliphatic, alicyclic or aromatic group having 1 to 8 carbon atoms; r and s represent an integer of 1 to 50; and q represents an integer of 1 to 20

$$-R_{10}- \tag{VII}$$

wherein $R_{10}$ represents an aliphatic, alicyclic or aromatic divalent group having 2 to 40 carbon atoms $$\underset{\underset{SO_3M}{|}}{-R_{11}-} \tag{VIII}$$

wherein $R_{11}$ represents an aliphatic, alicyclic or aromatic trivalent group having 2 to 20 carbon atoms and optionally having, in its structure, —O—, $$-\underset{\underset{O}{\|}}{C}-O-, \;\; -\underset{\underset{R_{12}}{|}}{N}-$$

(wherein $R_{12}$ represents a hydrogen atom or a substituted or unsubstituted aliphatic, alicyclic or aromatic group having 1 to 8 carbon atoms), $$-\underset{\underset{H}{|}}{N}-C-$$

or —SO$_2$—; M represents a hydrogen atom, ammonia group, alkali metal atom or alkaline earth metal atom $$\begin{array}{c} \overset{\underset{\|}{O}}{\phantom{x}} \\ CH_2=C-(R_1)-C-O-CH_2-\underset{|}{CH} \\ \hspace{4cm} R_{13} \\ CH_2=C-(R_1)-\underset{\underset{O}{\|}}{C}-O-CH_2-\underset{|}{CH} \end{array} \tag{IX}$$

wherein $R_1$ is as defined in the general formula (I); $R_{13}$ represents a substituted or unsubstituted aliphatic, alicyclic or aromatic divalent group and optionally having, in its structure —O—, $$-\underset{\underset{O}{\|}}{C}-O-, \text{ or } -\underset{\underset{R_{14}}{|}}{N}-$$

(wherein $R_{14}$ represents a hydrogen atom or a substituted or unsubstituted aliphatic, alicyclic or aromatic group having 1 to 8 carbon atoms)

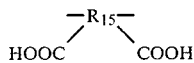 (X)

wherein $R_{15}$ represents an aliphatic, alicyclic or aromatic tetravalent group having 2 to 20 carbon atoms

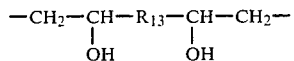 (XI)

wherein $R_{13}$ is as defined in general formula (IX).

2. A radiation curable polymer as recited in claim 1 in which $R_{11}$ of said component (VIII) represents an aromatic group.

3. A radiation curable polymer as recited in claim 1 in which M of said component (VIII) represents an alkali metal atom.

4. A radiation curable polymer as recited in claim 1 in which $R_{11}$ of said component (VIII) is derived from a diamine terminated diamide.

5. A radiation curable polymer as recited in claim 1 in which $R_{11}$ of said component (VIII) represents an aromatic group and is derived from a diamine terminated diamide, and M of said component (VIII) represents an alkali metal atom.

6. A radiation curable polymer which is an acrylate-terminated oligomer made by the reaction with organic diisocyanate of an amide carrying an alkali metal sulfonate and containing two isocyanate-reactive groups, a diol and monohydric acrylate.

7. A radiation curable polymer as recited in claim 6 in which said amide is a diamide having two terminal amine groups.

* * * * *